US012732809B2

(12) United States Patent
Yoshikawa

(10) Patent No.: US 12,732,809 B2
(45) Date of Patent: Sep. 8, 2026

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Yuki Yoshikawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 52 days.

(21) Appl. No.: 18/534,446

(22) Filed: Dec. 8, 2023

(65) Prior Publication Data

US 2024/0121607 A1 Apr. 11, 2024

Related U.S. Application Data

(63) Continuation of application No. PCT/JP2022/021202, filed on May 24, 2022.

(30) Foreign Application Priority Data

Jun. 9, 2021 (JP) ................................ 2021-096515
Apr. 27, 2022 (JP) ................................ 2022-073892

(51) Int. Cl.
*H04W 12/06* (2021.01)
*H04L 9/40* (2022.01)
(Continued)

(52) U.S. Cl.
CPC ........... *H04W 12/06* (2013.01); *H04L 63/205* (2013.01); *H04W 76/15* (2018.02); *H04W 84/12* (2013.01)

(58) Field of Classification Search
CPC ..... H04W 12/06; H04W 76/15; H04W 84/12; H04L 63/205
See application file for complete search history.

(56) References Cited

U.S. PATENT DOCUMENTS 10,791,572 B2 9/2020 Umehara
2011/0243058 A1* 10/2011 Yamada ............. H04W 12/069 370/315

(Continued)

FOREIGN PATENT DOCUMENTS

JP 201850133 A 3/2018
JP 201936776 A 3/2019

(Continued)

OTHER PUBLICATIONS

Anonymous, Wi-Fi 101: Wi-Fi 6E Progress and Reality, pp. 1-11.

(Continued)

*Primary Examiner* — David J Pearson

(74) *Attorney, Agent, or Firm* — Canon U.S.A., Inc. IP Division

(57) ABSTRACT

When a communication apparatus that can execute authentication that uses a Wi-Fi Protected Access (WPA)2 method and authentication that uses a WPA3 method performs communication with another communication apparatus in a state in which a link is established with the other communication apparatus via a plurality of frequency channels, the communication apparatus executes authentication using the WPA3 method based on at least one frequency channel of the plurality of frequency channels being a frequency channel included in a specific frequency band.

11 Claims, 24 Drawing Sheets

(51) Int. Cl.
*H04W 76/15* (2018.01)
*H04W 84/12* (2009.01)

(56) References Cited

U.S. PATENT DOCUMENTS

| | | | | |
|---|---|---|---|---|
| 2016/0323322 | A1* | 11/2016 | Shimizu | H04L 63/0428 |
| 2018/0035289 | A1* | 2/2018 | Shulman | H04L 63/08 |
| 2018/0235014 | A1* | 8/2018 | Li | H04W 72/30 |
| 2019/0050186 | A1 | 2/2019 | Suga | |
| 2020/0045534 | A1 | 2/2020 | Thakore | |
| 2020/0404540 | A1* | 12/2020 | Kerpez | H04W 28/0268 |
| 2021/0014776 | A1 | 1/2021 | Patil | |
| 2021/0195410 | A1* | 6/2021 | Goto | H04W 80/02 |
| 2021/0211279 | A1* | 7/2021 | Nix | H04L 67/34 |
| 2021/0320831 | A1* | 10/2021 | Park | H04W 72/0453 |
| 2022/0015022 | A1 | 1/2022 | Fujimori | |
| 2022/0377551 | A1* | 11/2022 | Sato | G09C 1/00 |

FOREIGN PATENT DOCUMENTS

| | | | | |
|---|---|---|---|---|
| JP | 2020167597 | A | 10/2020 | |
| WO | WO-2020054365 | A1 * | 3/2020 | H04W 80/02 |
| WO | 2021131756 | A1 | 7/2021 | |

OTHER PUBLICATIONS

LAN/MAN Standards Committee of the IEEE Computer Society, IEEE P802.11be/D0.2, Draft Standard for Information technology—Tele-communications and information exchange between systems Local and metropolitan area networks—Specific requirements, Part11:Wireless LAN Medium Access Control (MAC) and Physical Layer (PHY) Specifications, Amendment 8:Enhancements for extremely high throughput (EHT), Dec. 2020, pp. 1-409.
Anonymous, Wi-Fi 101: Wi-Fi 6E Progress and Reality, pp. 1-11, 2021.
PCT/JP2022/021202—Written Opinion.

* cited by examiner

FIG.4

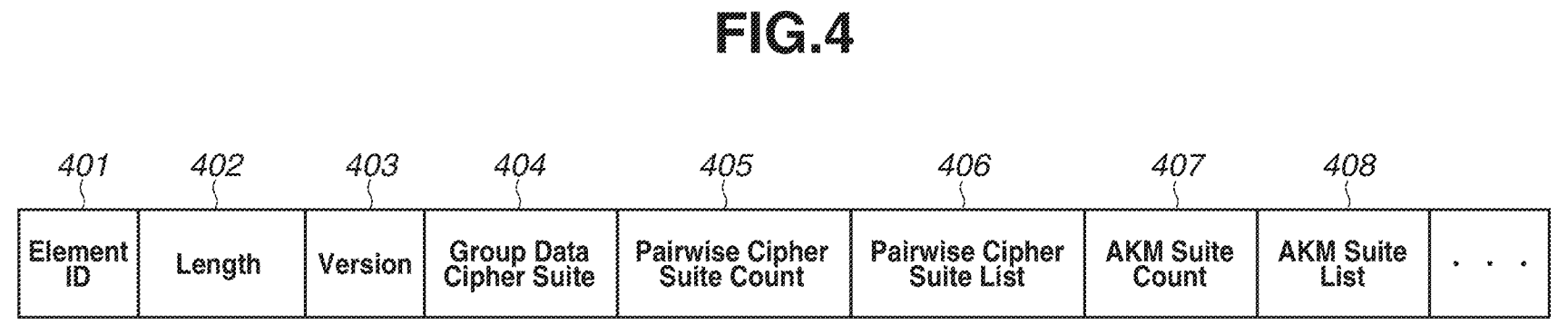

| 401 | 402 | 403 | 404 | 405 | 406 | 407 | 408 | |
|---|---|---|---|---|---|---|---|---|
| Element ID | Length | Version | Group Data Cipher Suite | Pairwise Cipher Suite Count | Pairwise Cipher Suite List | AKM Suite Count | AKM Suite List | . . . |

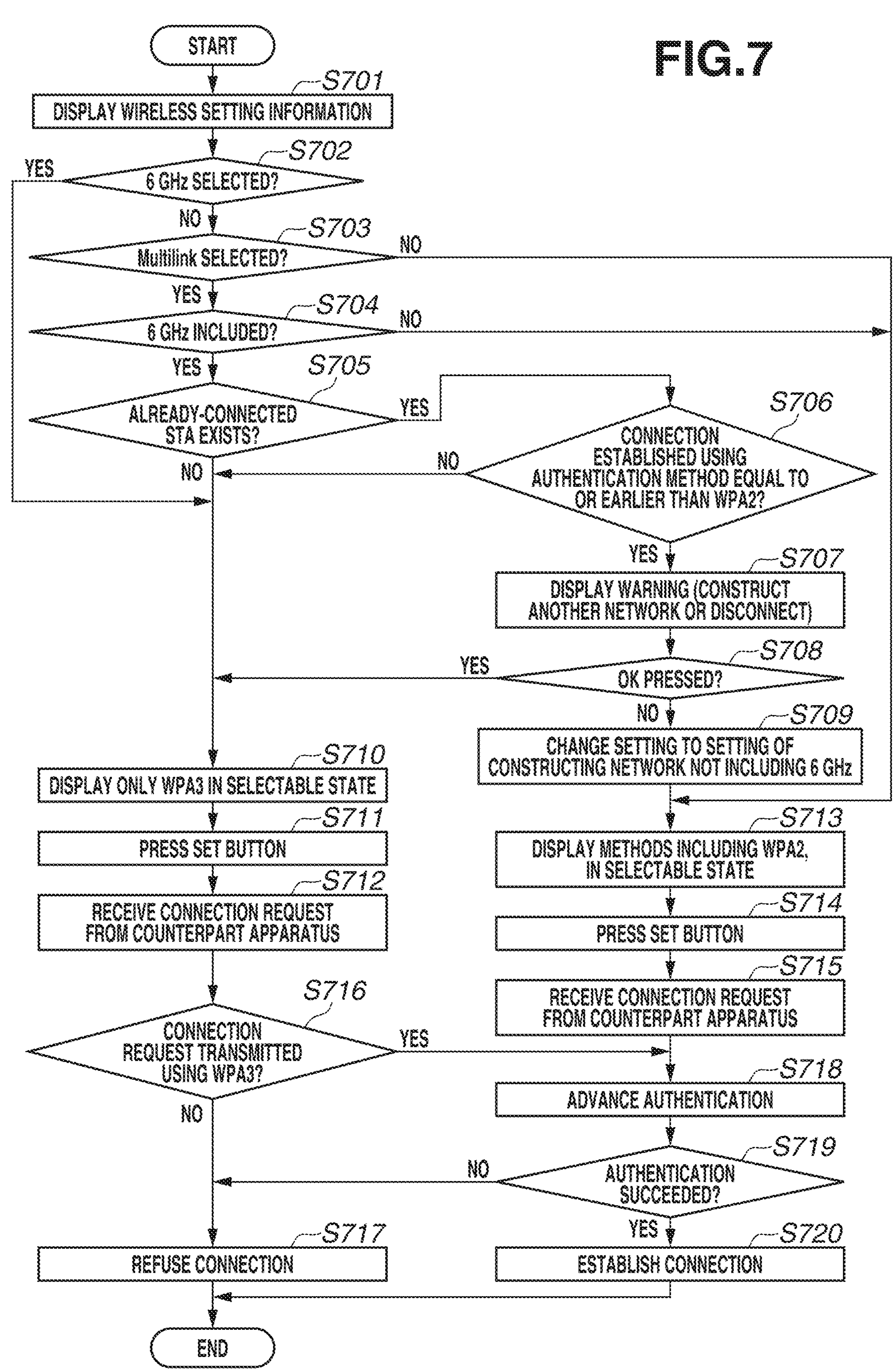
FIG.7
START
S701
DISPLAY WIRELESS SETTING INFORMATION
S702
6 GHz SELECTED?
YES
NO
S703
Multilink SELECTED?
NO
YES
S704
6 GHz INCLUDED?
NO
YES
S705
ALREADY-CONNECTED STA EXISTS?
YES
NO
S706
CONNECTION ESTABLISHED USING AUTHENTICATION METHOD EQUAL TO OR EARLIER THAN WPA2?
NO
YES
S707
DISPLAY WARNING (CONSTRUCT ANOTHER NETWORK OR DISCONNECT)
S708
OK PRESSED?
YES
NO
S709
CHANGE SETTING TO SETTING OF CONSTRUCTING NETWORK NOT INCLUDING 6 GHz
S710
DISPLAY ONLY WPA3 IN SELECTABLE STATE
S711
PRESS SET BUTTON
S712
RECEIVE CONNECTION REQUEST FROM COUNTERPART APPARATUS
S713
DISPLAY METHODS INCLUDING WPA2, IN SELECTABLE STATE
S714
PRESS SET BUTTON
S715
RECEIVE CONNECTION REQUEST FROM COUNTERPART APPARATUS
S716
CONNECTION REQUEST TRANSMITTED USING WPA3?
YES
NO
S718
ADVANCE AUTHENTICATION
S719
AUTHENTICATION SUCCEEDED?
NO
YES
S717
REFUSE CONNECTION
S720
ESTABLISH CONNECTION
END

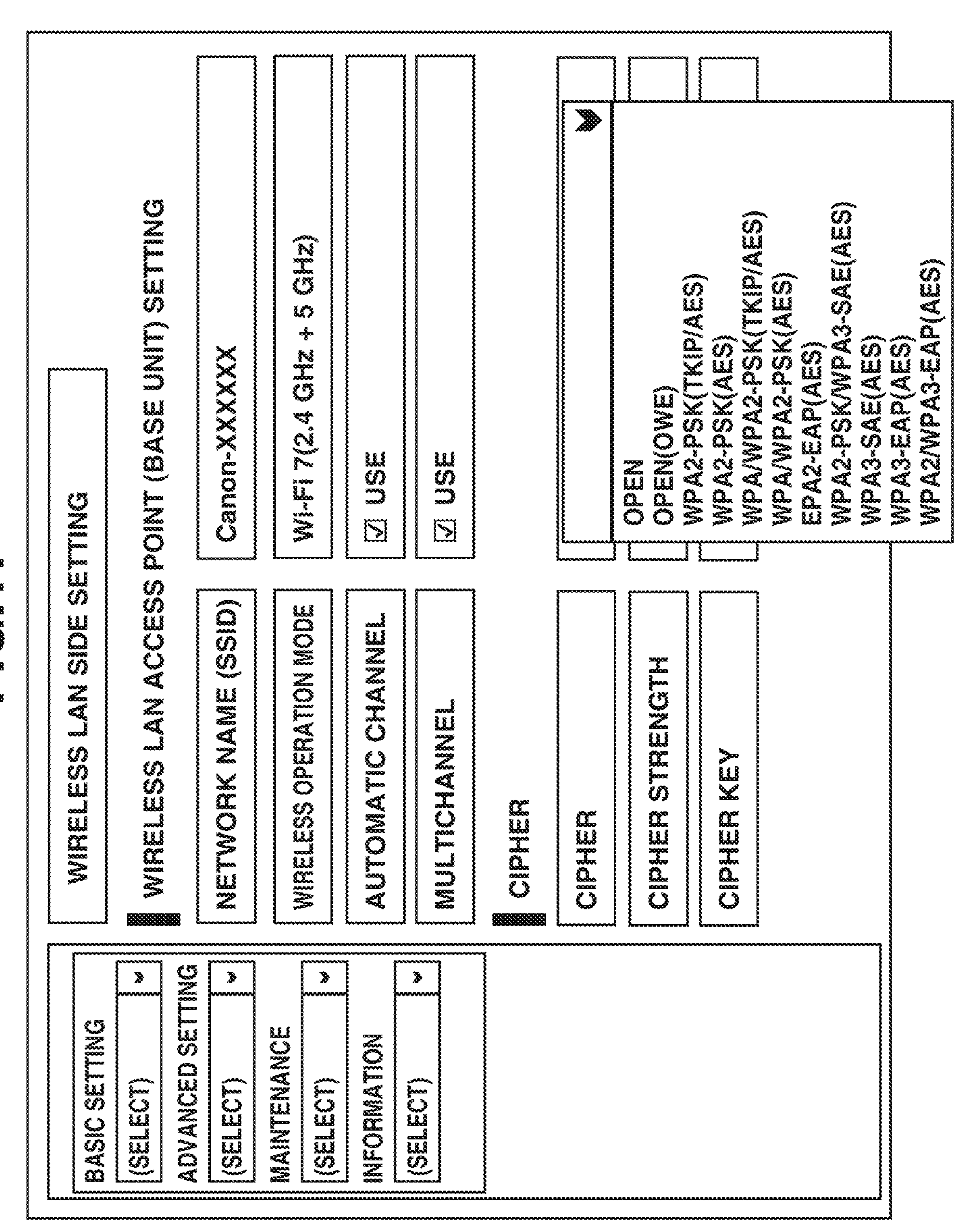
FIG.17
BASIC SETTING
(SELECT)
ADVANCED SETTING
(SELECT)
MAINTENANCE
(SELECT)
INFORMATION
(SELECT)
WIRELESS LAN SIDE SETTING
WIRELESS LAN ACCESS POINT (BASE UNIT) SETTING
NETWORK NAME (SSID)
Canon-XXXXXX
WIRELESS OPERATION MODE
Wi-Fi 7(2.4 GHz + 5 GHz)
AUTOMATIC CHANNEL
USE
MULTICHANNEL
USE
CIPHER
CIPHER
CIPHER STRENGTH
CIPHER KEY
OPEN
OPEN(OWE)
WPA2-PSK(TKIP/AES)
WPA2-PSK(AES)
WPA/WPA2-PSK(TKIP/AES)
WPA/WPA2-PSK(AES)
EPA2-EAP(AES)
WPA2-PSK/WPA3-SAE(AES)
WPA3-SAE(AES)
WPA3-EAP(AES)
WPA2/WPA3-EAP(AES)

FIG.19

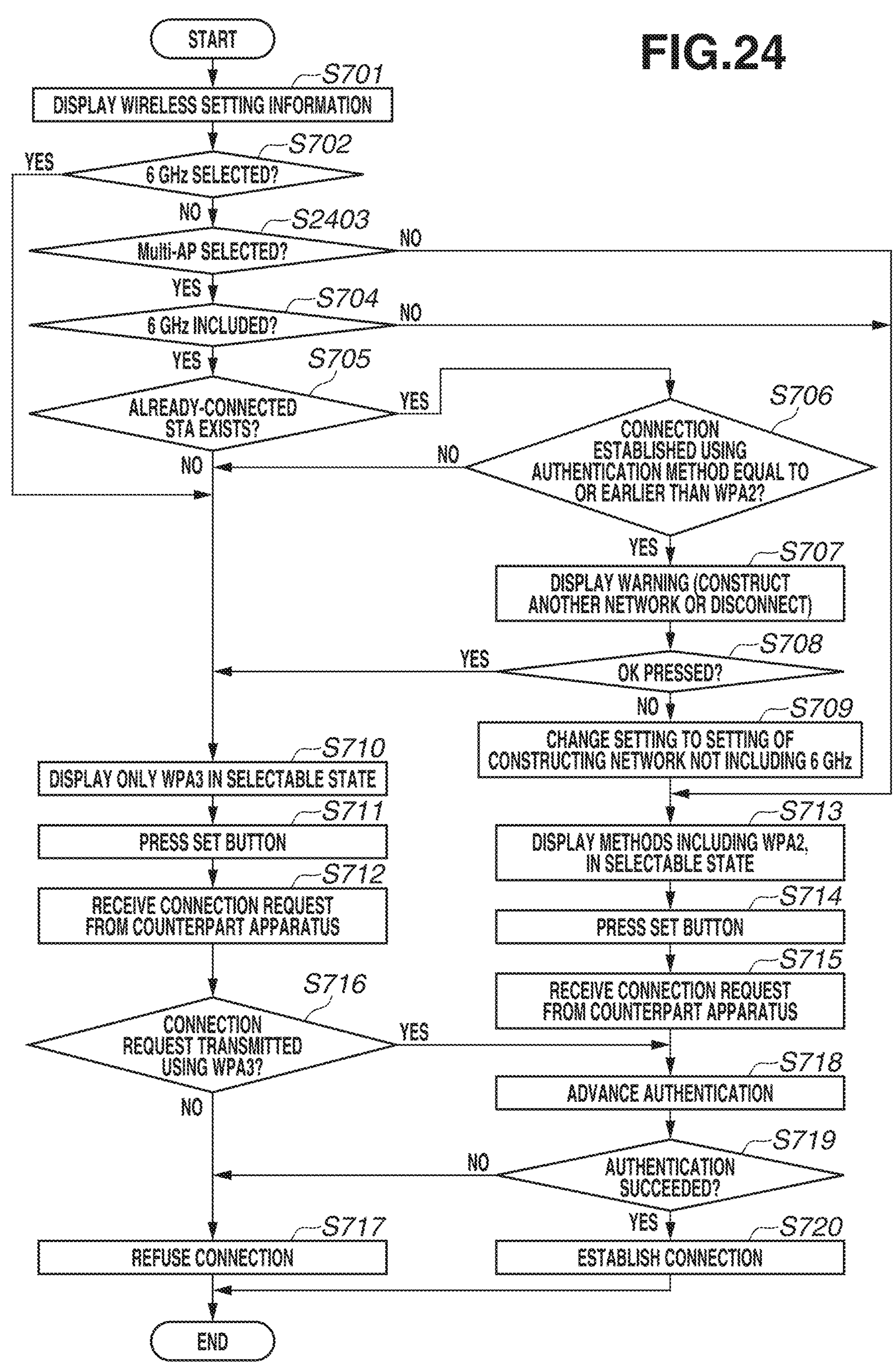

FIG.24
START
S701
DISPLAY WIRELESS SETTING INFORMATION
S702
6 GHz SELECTED?
YES
NO
S2403
Multi-AP SELECTED?
NO
YES
S704
6 GHz INCLUDED?
NO
YES
S705
ALREADY-CONNECTED STA EXISTS?
YES
NO
S706
CONNECTION ESTABLISHED USING AUTHENTICATION METHOD EQUAL TO OR EARLIER THAN WPA2?
NO
YES
S707
DISPLAY WARNING (CONSTRUCT ANOTHER NETWORK OR DISCONNECT)
S708
OK PRESSED?
YES
NO
S709
CHANGE SETTING TO SETTING OF CONSTRUCTING NETWORK NOT INCLUDING 6 GHz
S710
DISPLAY ONLY WPA3 IN SELECTABLE STATE
S711
PRESS SET BUTTON
S712
RECEIVE CONNECTION REQUEST FROM COUNTERPART APPARATUS
S713
DISPLAY METHODS INCLUDING WPA2, IN SELECTABLE STATE
S714
PRESS SET BUTTON
S715
RECEIVE CONNECTION REQUEST FROM COUNTERPART APPARATUS
S716
CONNECTION REQUEST TRANSMITTED USING WPA3?
YES
NO
S718
ADVANCE AUTHENTICATION
S719
AUTHENTICATION SUCCEEDED?
NO
YES
S717
REFUSE CONNECTION
S720
ESTABLISH CONNECTION
END

COMMUNICATION APPARATUS, COMMUNICATION METHOD, AND STORAGE MEDIUM

CROSS-REFERENCE TO RELATED APPLICATIONS

This application is a Continuation of International Patent Application No. PCT/JP2022/021202, filed May 24, 2022, which claims the benefit of Japanese Patent Applications No. 2021-096515, filed Jun. 9, 2021, and No. 2022-073892, filed Apr. 27, 2022, all of which are hereby incorporated by reference herein in their entireties.

BACKGROUND OF THE INVENTION

Field of the Invention

The present invention relates to a communication apparatus that performs wireless communication.

Background Art

The standards of wireless local area network (LAN) techniques have been formulated by the Institute of Electrical and Electronics Engineers (IEEE) 802.11, which is a standard-setting organization of wireless LAN techniques, and the standards of wireless LAN techniques include IEEE 802.11/a/b/g/n/ac/ax, and the like. Here, the IEEE stands for Institute of Electrical and Electronics Engineers.

In the IEEE 802.11ax discussed in Patent Literature 1, in addition to high peak throughput being up to 9.6 gigabit per second (Gbps), communication speed increase under a congestion situation is achieved by the orthogonal frequency-division multiple access (OFDMA). In addition, the OFDMA stands for orthogonal frequency-division multiple access.

For further throughput enhancement, a Task Group that formulates the standard of the IEEE 802.11be as a succeeding standard of the IEEE 802.11ax has been inaugurated.

An access point (AP) of an IEEE 802.11 has conventionally established connection with a station (STA) via a single frequency channel, and performed communication. In the IEEE 802.11be standard, multi-link communication has been considered. In the multi-link communication, one AP simultaneously establishes a plurality of links with an STA via a plurality of frequency channels including a 2.4-gigahertz (GHz) band, a 5-GHz band, and a 6-GHz band, and performs communication.

On the other hand, the standardization executed by the Wi-Fi Alliance that guarantees interconnection of wireless LAN techniques plays a significant role, and in the wireless LAN techniques, the normalization of Wi-Fi Protected Access 3 (WPA3) being an authentication program with higher safety has been under progress. The WPA stands for Wi-Fi Protected Access.

In addition, in the communication executed via a wireless LAN, the cipher of communication is performed using a Pairwise Transient Key (PTK) being a cipher key for ciphering unicast communication, and a Group Transient Key (GTK) being a cipher key for broadcast communication or multicast communication. Here, the PTK stands for a Pairwise Transient Key and the GTK stands for a Group Transient Key.

Furthermore, in the multi-link communication that has been currently considered in the 11be standard, the use of a common PTK in links for establishing connection has been considered.

In the multi-link communication, to use a common PTK in links, it is necessary to perform authentication and cipher of the links using the same security method in the links. In addition, it is defined to perform authentication and cipher using the WPA3 in the case of performing communication in the 6-GHz band. Nevertheless, for example, in a case where a communication apparatus and another communication apparatus perform communication by simultaneously establishing a plurality of links via frequency channels in the 6-GHz band and frequency channels in a band other than the 6-GHz band, authentication or cipher might be performed using different security methods among the links.

CITATION LIST

Patent Literature

PTL 1: Japanese Patent Laid-Open No. 2018-50133

SUMMARY OF THE INVENTION

In view of the above-described issues, when performing communication with a different communication apparatus in a state in which a communication apparatus and the other communication apparatus has established a plurality of links, in the case of operating in a specific frequency channel, the communication apparatus of the present invention aims to perform authentication using a specific security method.

To achieve the above-described aim, a communication apparatus according to the present invention is a communication apparatus that can execute at least an authentication method that uses Wi-Fi Protected Access (WPA)2 and an authentication method that uses WPA3 including an establishment unit for establishing a link between the communication apparatus and another communication apparatus, and a control unit for controlling the authentication method of communication with the other communication apparatus, wherein, in a case where a plurality of links is to be established between the communication apparatus and the other communication apparatus, the control unit performs authentication processing for the other communication apparatus using the WPA3 as the authentication method, and wherein, in a case where a link using a frequency channel included in a specific frequency band is to be established between the communication apparatus and the other communication apparatus, the control unit uses the WPA3 as the authentication method to perform the authentication processing for the other communication apparatus.

Further, a control method according to the present invention is a control method for a communication apparatus that can execute at least an authentication method that uses Wi-Fi Protected Access (WPA)2 and an authentication method that uses WPA3 including establishing a link between the communication apparatus and another communication apparatus, and controlling the authentication method of communication with the other communication apparatus, wherein, in the controlling, in a case where a plurality of links is to be established between the communication apparatus and the other communication apparatus, authentication processing for the other communication apparatus is performed using the WPA3 as the authentication method, and wherein, in the controlling, in a case where a link using a frequency channel included in a specific frequency band is to be established between the communication apparatus and the other communication apparatus, the authentication processing for the other communication apparatus is performed using the WPA3 as the authentication method.

Still further, the communication apparatus according to the present invention is a communication apparatus that can execute at least an authentication method that uses Wi-Fi Protected Access (WPA)2 and an authentication method that uses WPA3 including a constructing unit for constructing a network, an establishment unit for establishing a plurality of links between the communication apparatus and another communication apparatus via frequency channels different from each other; and a control unit for controlling the authentication method in the network, wherein, in a case where the plurality of links is to be established to include a link in a first network constructed by the constructing unit, the control unit sets the WPA3 as the authentication method in the first network.

Yet further, the control method according to the present invention is a control method for a communication apparatus that can execute at least an authentication method that uses Wi-Fi Protected Access (WPA)2 and an authentication method that uses WPA3 including constructing a network, controlling the authentication method in the network, and establishing a plurality of links between the communication apparatus and another communication apparatus via frequency channels different from each other, wherein, in the controlling, in a case where the plurality of links is to be established to include a link in a first network constructed in the constructing, the WPA3 is set as the authentication method in the first network.

Further features of the present invention will become apparent from the following description of exemplary embodiments with reference to the attached drawings.

BRIEF DESCRIPTION OF THE DRAWINGS

FIG. 4 illustrates an example of an element indicating a Robust Security Network element (RSNE) to be granted in accordance with a security method determined by a communication apparatus 101 according to the present invention.

FIG. 7 is a flowchart illustrating processing in which the communication apparatus 101 according to the present invention determines a security method.

FIG. 14 illustrates an example of graphical user interface display according to the present invention.

FIG. 16 illustrates an example of graphical user interface display according to the present invention.

FIG. 17 illustrates an example of graphical user interface display according to the present invention.

FIG. 19 illustrates an example of graphical user interface display according to the present invention.

FIG. 24 is a flowchart illustrating processing in which the communication apparatus 101 according to the present invention determines a security method.

DESCRIPTION OF THE EMBODIMENTS

Figure 1:
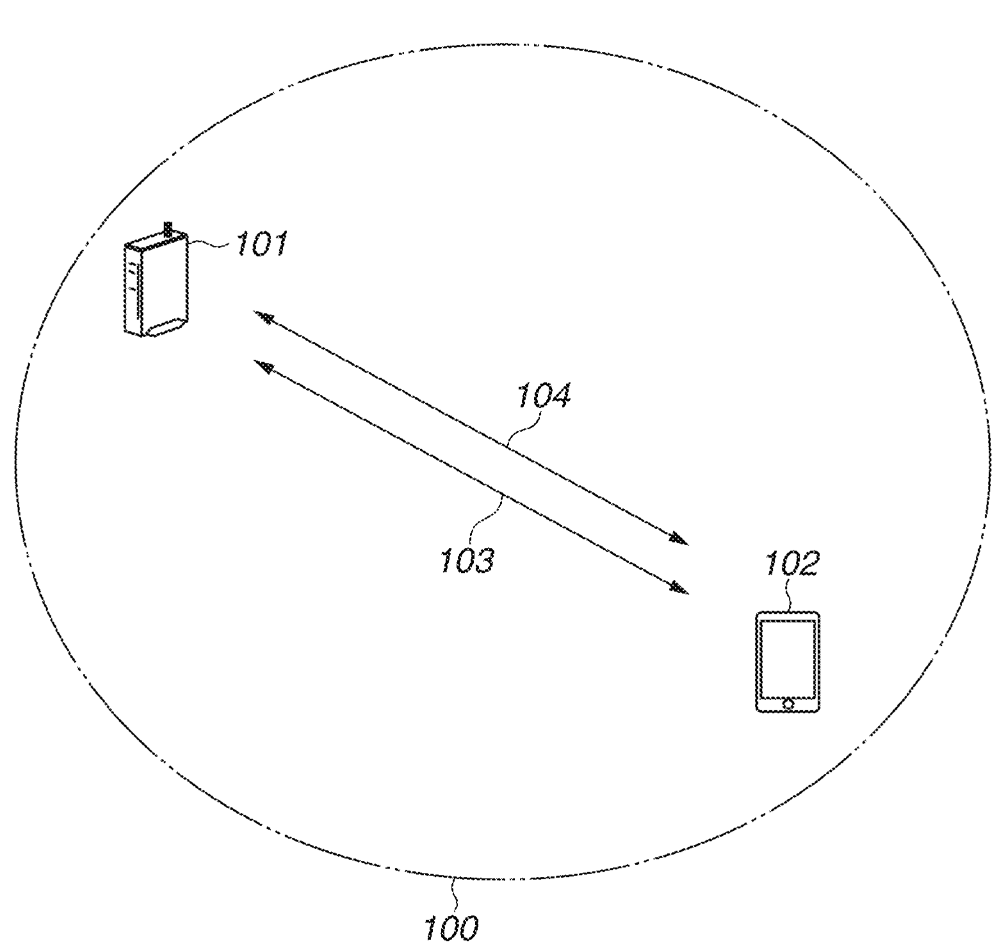
FIG. 1 is a diagram illustrating a configuration of a network according to the present invention.

Hereinafter, an exemplary embodiment of the present invention will be described in detail with reference to the accompanying drawings. In addition, the configurations described in the following exemplary embodiment are mere examples, and the present invention is not limited to the configurations illustrated in the drawings.

(Configuration of Wireless Communication System)

FIG. 1 illustrates a configuration of a network in which a communication apparatus 102 according to the present exemplary embodiment participates. The communication apparatus 102 is a station (STA) having a role of participating in a network 100. The communication apparatus 101 is an access point (AP) having a role of constructing the wireless network 100. The communication apparatus 101 can communicate with the communication apparatus 102.

The communication apparatuses 101 and 102 can each execute wireless communication complying with the Institute of Electrical and Electronics Engineers (IEEE) 802.11be (extremely high throughput (EHT)) standard. In addition, the IEEE stands for the Institute of Electrical and Electronics Engineers. The communication apparatuses 101 and 102 can execute communication at frequencies in a 2.4-gigahertz (GHz) band, a 5-gigahertz (GHz) band, and a 6-GHz band. Frequency bands to be used by each communication apparatus are not limited to these, and a different frequency band such as a 60 GHz band, for example, may be used. In addition, the communication apparatuses 101 and 102 can execute communication using bandwidths including a 20-megahertz (MHz) band, a 40-MHz band, a 80-MHz band, a 160-MHz band, and a 320-MHz band. Bandwidths to be used by each communication apparatus are not limited to these, and a different bandwidth such as 240 MHz or 4 MHz, for example, may be used. By executing orthogonal frequency division multiple access (OFDMA) communication complying with the IEEE 802.11be standard, the communication apparatuses 101 and 102 can implement multi user (MU) communication in which signals of a plurality of users are multiplexed. The OFDMA stands for orthogonal frequency division multiple access. In the OFDMA communication, a part (resource unit (RU)) of divided frequency bands is allocated to each STA while avoiding redundancy, and carriers of the respective STAs are orthogonal. The AP can therefore concurrently communicate with a plurality of STAs in a prescribed bandwidth.

In addition, the communication apparatuses 101 and 102 comply with the IEEE 802.11be standard, but the communication apparatuses 101 and 102 may additionally comply with legacy standards, which are standards formulated earlier than the IEEE 802.11be standard. Specifically, the communication apparatuses 101 and 102 may comply with at least any one of the IEEE 802.11a/b/g/n/ac/ax standards. In addition to the IEEE802.11 series standards, the communication apparatuses 101 and 102 may comply with other communication standards such as Bluetooth (registered trademark), near field communication (NFC), an ultra wide band (UWB), ZigBee, and multi band OFDM alliance (MBOA). The UWB stands for an ultra wide band, and the MBOA stands for a multi band OFDM alliance. In addition, the NFC stands for near field communication. The UWB includes a wireless universal serial bus (USB), wireless 1394, Winners Information Network (WiNET), and the like. In addition, the communication apparatuses 101 and 102 may comply with a communication standard of wired communication of a wired LAN or the like. Specific examples of the communication apparatus 101 include a wireless LAN router, a personal computer (PC), and the like, but the communication apparatus 101 is not limited to these. In addition, the communication apparatus 101 may be an information processing apparatus such as a wireless chip that can execute wireless communication complying with the IEEE 802.11be standard. In addition, specific examples of the communication apparatus 102 include a camera, a tablet, a smartphone, a PC, a mobile phone, a video camera, a headset, and the like, but the communication apparatus 102 is not limited to these. In addition, the communication apparatus 102 may be an information processing apparatus such as a wireless chip that can execute wireless communication complying with the IEEE 802.11be standard.

Each communication apparatus can execute communication using bandwidths such as 20 MHz, 40 MHz 80 MHz 160 MHz, and 320 MHz.

In addition, the communication apparatuses 101 and 102 execute multi-link communication of executing communication by establishing links via a plurality of frequency channels. In the IEEE 802.11 series standards, a bandwidth of each frequency channel is defined as 20 MHz. Here, a frequency channel is a frequency channel defined by the IEEE 802.11 series standards, and in the IEEE 802.11 series standards, a plurality of frequency channels are defined in each of the frequency bands including the 2.4-GHz band, the 5-GHz band, the 6-GHz band, and a 60-GHz band. In addition, by bonding adjacent frequency channels, a bandwidth equal to or larger than 40 MHz may be used in one frequency channel. For example, the communication apparatus 101 can execute communication by establishing a link 103 with the communication apparatus 102 via a first frequency channel in the 2.4-GHz band. Concurrently with this, the communication apparatus 102 can execute communication by establishing a link 104 with the communication apparatus 101 via a second frequency channel in the 5-GHz band. In this case, concurrently with the link 103 established via the first frequency channel, the communication apparatus 102 executes multi-link communication of maintaining the second link 104 established via the second frequency channel. In this manner, by simultaneously establishing a plurality of links with the communication apparatus 102 via a plurality of frequency channels, the communication apparatus 101 can enhance throughput in communication with the communication apparatus 102. In the present exemplary embodiment, the link 103 is regarded as 20-MHz connection established via 6 ch in the 2.4-GHz band, and 1 is allocated as a link number. The link 104 is regarded as 320-MHz connection established via 113 ch in the 6-GHz band, and 2 is allocated as a link number.

For example, in addition to the link 103 in the 2.4-GHz band and the second link 104 in the 6-GHz band, the communication apparatuses 101 and 102 may establish a third link in the 5-GHz band. Alternatively, the communication apparatuses 101 and 102 may establish links via a plurality of different channels included in the same frequency band. For example, the communication apparatuses 101 and 102 may establish a link via the 6 ch in the 2.4-GHz band as a first link, and additionally establish a link via 1 ch in the 2.4-GHz band as a second link. In addition, links in the same frequency band and links in different frequency bands may coexist. For example, in addition to the link 103 established via 6 ch in the 2.4-GHz band, the communication apparatuses 101 and 102 may establish a link via the 1 ch in the 2.4-GHz band and a link via a 149 ch in the 5-GHz band. By establishing a plurality of connections with the communication apparatus 102 in different frequency bands, even in a case where a certain band is busy, the communication apparatus 101 can establish communication with the communication apparatus 102 in the other bands. This can prevent a decline in throughput and communication delay.

In addition, the wireless network 100 illustrated in FIG. 1 includes one AP and one STA, but the numbers and the arrangement of APs and STAs are not limited to these. For example, in addition to the wireless network illustrated in FIG. 1, the number of STAs may be increased by one. At this time, a frequency band of each link to be established, the number of links, and a frequency width are not limited.

In the case of performing multi-link communication, the communication apparatuses 101 and 102 divide one data and transmit the divided data to a partner apparatus via a plurality of links.

In addition, the communication apparatuses 101 and 102 may be enabled to execute multiple-input and multiple-output (MIMO) communication. In this case, the communication apparatuses 101 and 102 include a plurality of antennas, and one transmits a different signal from each antenna using the same frequency channel. A reception side simultaneously receives all signals that have arrived from a plurality of streams using the plurality of antennas, separates the signals from the streams, and decodes the signals. By executing MIMO communication in this manner, the communication apparatuses 101 and 102 can communicate a larger amount of data during the same time as compared with a case where the MIMO communication is not executed. In addition, the communication apparatuses 101 and 102 may execute MIMO communication via a part of links in the case of performing multi-link communication.

In the present exemplary embodiment, in addition to the standard of the Wi-Fi Protected Access (WPA) being a security method, the communication apparatuses 101 and 102 support the WPA2 and WPA3 standards. The WPA, WPA2, and WPA3 standards are standards for performing the authentication of a counterpart apparatus and the cipher of communication with the counterpart apparatus. Because the communication apparatuses 101 and 102 support the WPA3 standard, the communication apparatuses 101 and 102 can use Simultaneous Authentication of Equals (SAE) being a method of sharing a cipher key in the WPA3 standard. In addition, because there is no need to consider interconnectivity with existing communication apparatuses in communication at 6 GHz, in the Wi-Fi Alliance, it is determined that the authentication and cipher of communication at 6 GHz are performed using the WPA3. In addition, in the WPA3, an Advanced Encryption Standard-Counter mode with CBC-MAC Protocol (AES-CCMP) or an AES-Galois/Counter Mode Protocol (GCMP) is used as a cipher method instead of a Temporal Key Integrity Protocol (TKIP) or wired equivalent privacy (WEP).

Figure 2:
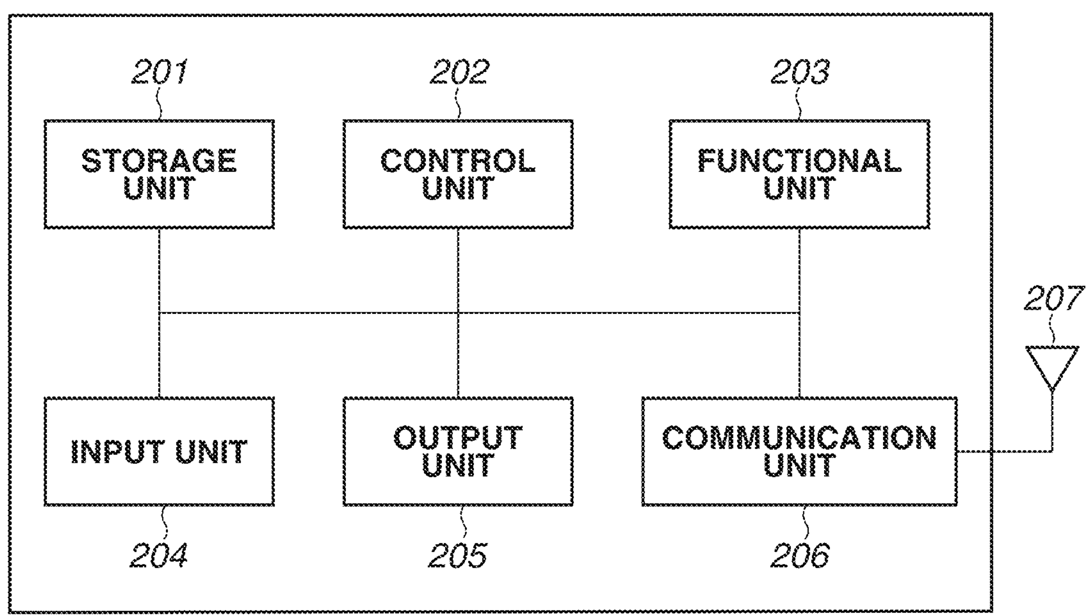
FIG. 2 is a diagram illustrating a hardware configuration of a communication apparatus according to the present invention.

FIG. 2 illustrates a hardware configuration example of the communication apparatus 101 according to the present exemplary embodiment. The communication apparatus 101 includes a storage unit 201, a control unit 202, a functional unit 203, an input unit 204, an output unit 205, a communication unit 206, and an antenna 207. In addition, a plurality of antennas may be provided.

The storage unit 201 includes one or more memories such as a read only memory (ROM) and a random access memory (RAM), and stores computer programs for performing various operations to be described below, and various types of information such as communication parameters for wireless communication. The ROM stands for a read only memory and the RAM stands for a random access memory. Aside from memories such as a ROM and a RAM, a storage medium such as a flexible disk, a hard disk, an optical disk, a magneto-optical disk, a compact disk read only memory (CD-ROM), a CD recordable (CD-R), a magnetic tape, a nonvolatile memory card, or a digital versatile disk (DVD) may be used as the storage unit 201. In addition, the storage unit 201 may include a plurality of memories and the like.

For example, the control unit 202 includes one or more processors such as a central processing unit (CPU) and a micro processing unit (MPU), for example. By executing computer programs stored in the storage unit 201, the control unit 202 controls the entire communication apparatus 101. The control unit 202 may control the entire communication apparatus 101 in cooperation with computer programs stored in the storage unit 201 and an operating system (OS). In addition, the control unit 202 generates data and signals (radio frames) to be transmitted in the communication with another communication apparatus. In addition, the CPU stands for a central processing unit and the MPU stands for a micro processing unit. In addition, the control unit 202 may include a plurality of processors such as multi-core processors, and control the entire communication apparatus 101 using the plurality of processors.

In addition, the control unit 202 executes predetermined processing such as wireless communication, image capturing, printing, and projection by controlling the functional unit 203. The functional unit 203 is hardware for the communication apparatus 101 executing the predetermined processing.

The input unit 204 receives various operations from the user. The output unit 205 performs various outputs to the user via a monitor screen and a speaker. Here, the output performed by the output unit 205 may be display on the monitor screen, voice output by the speaker, vibration output, or the like. In addition, both the input unit 204 and the output unit 205 may be implemented by one module like a touch panel. In addition, the input unit 204 and the output unit 205 may be each formed integrally with the communication apparatus 101, or may be each formed separately from the communication apparatus 101.

The communication unit 206 controls wireless communication complying with the IEEE 802.11be standard. In addition, the communication unit 206 may control wireless communication complying with other IEEE 802.11 series standards in addition to the IEEE 802.11be standard, and may control wired communication via a wired LAN or the like. The communication unit 206 controls the antenna 207, and transmits and receives signals for wireless communication that have been generated by the control unit 202.

In a case where the communication apparatus 101 complies with an NFC standard, a Bluetooth standard, and the like in addition to the IEEE 802.11be standard, the communication unit 206 may control wireless communication complying with these communication standards. In addition, in a case where the communication apparatus 101 can execute wireless communication complying with a plurality of communication standards, communication units and antennas that correspond to the respective communication standards may be individually included. Via the communication unit 206, the communication apparatus 101 communicates data such as image data, document data, and video data with the communication apparatus 102. In addition, the antenna 207 may be formed separately from the communication unit 206, or may be formed as one module together with the communication unit 206.

The antenna 207 is an antenna that can execute communication in the 2.4-GHz band, the 5-GHz band, and the 6-GHz band. In the present exemplary embodiment, the communication apparatus 101 includes one antenna, but may include three antennas. Alternatively, the communication apparatus 101 may include different antennas for the respective frequency bands. In addition, in a case where the communication apparatus 101 includes a plurality of antenna, the communication apparatus 101 may include communication units 206 corresponding to the respective antennas.

In addition, the communication apparatus 102 has a hardware configuration similar to the communication apparatus 101.

Figure 3:
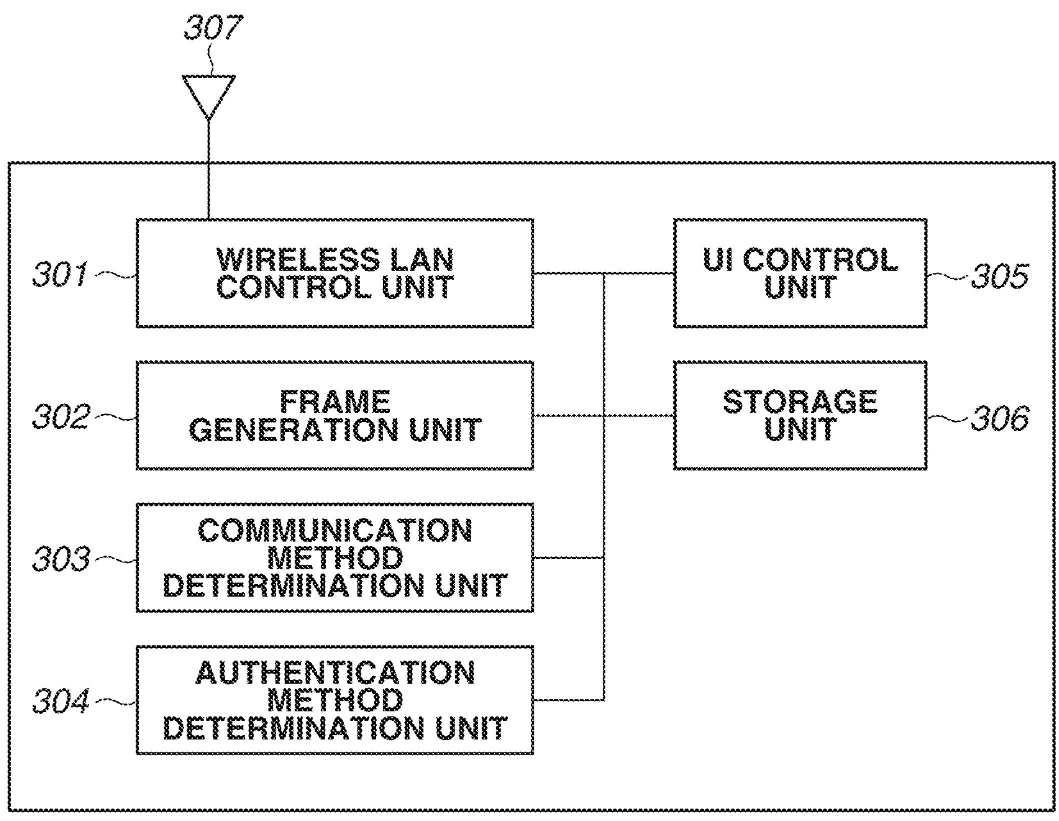
FIG. 3 is a diagram illustrating a functional configuration of a communication apparatus according to the present invention.

FIG. 3 illustrates a block diagram of a functional configuration of the communication apparatus 101 according to the present exemplary embodiment. In addition, the communication apparatus 102 also has a similar configuration. Here, the communication apparatus 101 includes a wireless LAN control unit 301. In addition, the number of wireless LAN control units is not limited to one, and may be two or may be three or more. The communication apparatus 101 further includes a frame generation unit 302, a communication method determination unit 303, an authentication method determination 304, a user interface (UI) control unit 305, a storage unit 306, and a wireless antenna 307.

The wireless LAN control unit 301 includes an antenna and a circuit for transmitting and receiving wireless signals to and from another wireless LAN apparatus, and a program for controlling these. In accordance with the IEEE 802.11 standard series, the wireless LAN control unit 301 executes communication control of a wireless LAN based on a frame generated by the frame generation unit 302.

The frame generation unit 302 generates a wireless control frame to be transmitted by the wireless LAN control unit 301. The content of wireless control frame to be generated by the frame generation unit 302 may be restricted based on a setting stored in the storage unit 306. Alternatively, the content may be changed based on a user setting from the UI control unit 305. Information regarding the generated frame is transmitted to the wireless LAN control unit 301, and transmitted to a communication partner.

A communication method determination unit 303 determines a communication format to be used when communication is executed with a partner apparatus, based on a received frame received from the wireless LAN control unit 301, and setting information obtained by the UI control unit 305. The communication method determination unit 303 also conveys the determined communication format to an authentication method determination unit 304. After a communication method is determined, the wireless LAN control unit 301 performs communication with a partner apparatus in accordance with the determined communication method.

The authentication method determination unit 304 determines a method of authenticating a partner apparatus, based on information from the communication method determination unit 303, and setting information obtained by the UI control unit 305. The wireless LAN control unit 301 authenticates a partner apparatus based on the determined authentication method.

The UI control unit 305 includes hardware components that are related to a user interface, such as a touch panel or a button for receiving an operation on an AP that are performed by the user (not illustrated) of the AP, and a program for controlling these. In addition, the UI control unit 305 also has a function for presenting information to the user, such as the display of images or voice output, for example.

The storage unit 306 is a storage device that can include a ROM and a RAM that store programs and data for operating an AP.

FIG. 4 illustrates a Robust Security Network element (RSNE) defined by the IEEE 802.11. The RSNE is stored in a management frame complying with the IEEE 802.11.

An Element ID field 401 indicates that a corresponding element is an RSNE. That is, a value is 48.

A Pairwise Cipher Suite Count field 405 indicates the number of applicable cipher methods. A specific value is indicated by a Pairwise Cipher Suite List field 406. For example, in a case where CCMP-128 is applicable, 00-0F-AC-04 is indicated. In a case where the Pairwise Cipher Suite Count field 405 indicates that a plurality of cipher methods are applicable, such as a case where the Pairwise Cipher Suite Count field 405 indicates two, for example, a plurality of values are consecutively provided in 406. For example, in a case where CCMP-128 and GCMP-128 are applicable, after 00-0F-AC-04, 00-0F-AC-08 is indicated. This order may be reversed. In addition, the number of applicable cipher methods may be any number.

An Auth Key Management (AKM) Suite Count field 407 indicates the number of applicable authentication methods. A specific value is indicated by an AKM Suite List field 408. Because only WPA3-SAE is granted to the RSNE in the present exemplary embodiment, the AKM Suite Count field 407 indicates one, and the AKM Suite List field 408 indicates 00-0F-AC-08 indicating the SAE. In addition, this value is only required to be a value defined by a standard equal to or later than the WPA3. More specifically, in a case where an authentication method having SHA-384 as a hash in the SAE is added to 00-0F-AC-14, this may be indicated in addition to the above-described value. In addition, 00-0F-AC-09 indicating the execution of Fast Transition (FT) in the SAE may be included. Nevertheless, because only the WPA3 is applicable, 00-0F-AC-02 and 00-0F-AC-06 indicating a pre-shared key (PSK) are not included.

Figure 5:
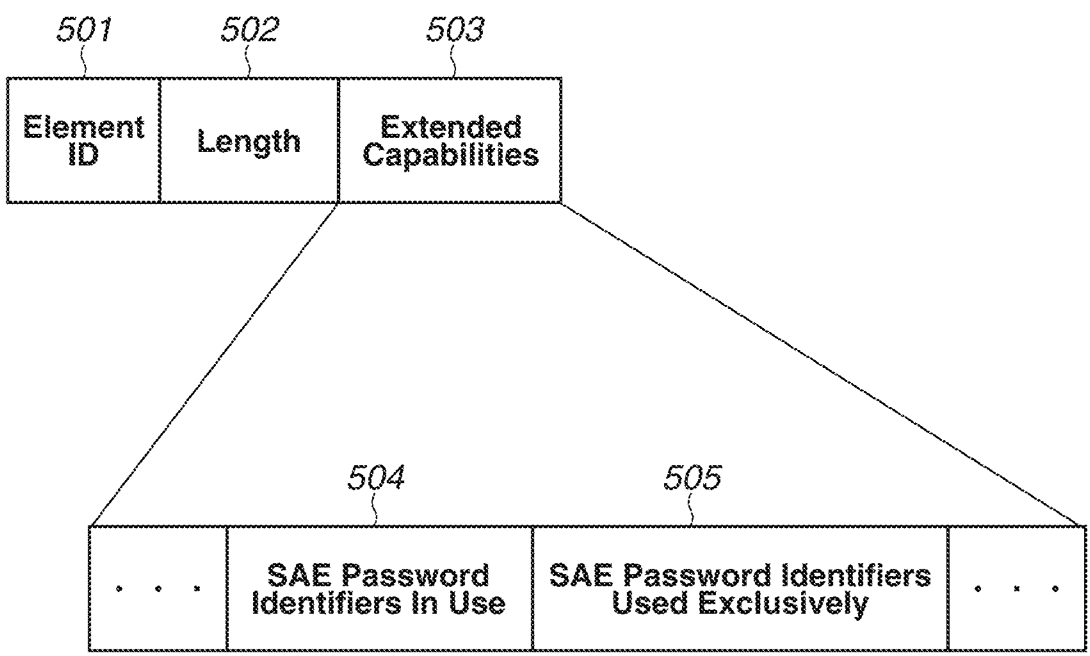
FIG. 5 illustrates an example of an element indicating an Extended Capability to be granted in accordance with a security method determined by the communication apparatus 101 according to the present invention.

FIG. 5 illustrates Extended Capability defined by the IEEE 802.11. The Extended Capability is stored in a management frame complying with the IEEE 802.11.

Fields illustrated in FIG. 5 include, from the beginning, an Element ID field 501, a Length field 502, and an Extended Capabilities field 503.

The Extended Capabilities field 503 includes an SAE Password Identifiers In Use subfield 504 and an SAE Password Identifiers Used Exclusively subfield 505. These fields are enabled in a case where a Password ID for making an ID for changing a password, settable for each user is used when a network of the same service set identifier (SSID) is constructed. For example, in a case where a part of the constructed network is set to "with Password ID", the SAE Password Identifiers In Use subfield 504 is enabled. In a case where the whole constructed network is set to "with Password ID", the subfield 504 and the subfield 505 are enabled.

These values may be enabled when a network for using 6 GHz in multi-link communication, for example, is constructed in addition to an existing network. For example, by requiring a Password ID when connection is established with a network including 6 GHz via multi-link communication, it becomes possible to force connection that uses the WPA3 being compatible with a Password ID. It is considered that, to require a Password ID, for example, a compatible device always prepares a bit for establishing connection using a predetermined method, and the bit is set to on.

In addition, for example, in the case of constructing a network including 6 GHz via multi-link communication, the SAE Password Identifiers In Use subfield 504 may be always enabled. Because the confidentiality of a password is enhanced by the use of a Password ID, security is considered to improve. Thus, by always enabling a Password ID when 6 GHz is included via multi-link communication, the communication apparatus 102 becomes able to construct a network with higher safety. In contrast, assuming that an AP that constructs a network including 6 GHz via multi-link communication despite the SAE Password Identifiers In Use is disabled is unreliable, an STA can also perform control in such a manner as to avoid connection. In addition, when an STA incompatible with a Password ID transmits a connection request, an AP may perform control in such a manner as to avoid connection, assuming that the STA is unreliable.

Figure 6:
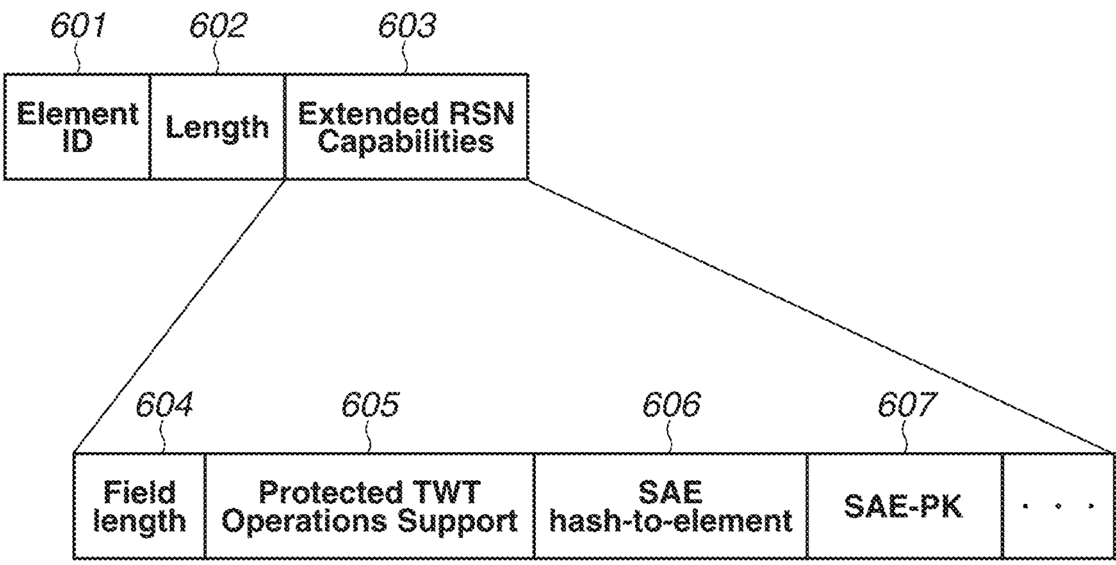
FIG. 6 illustrates an example of an element indicating an RSN Extension element (RSNXE) to be granted in accordance with a security method determined by the communication apparatus 101 according to the present invention.

FIG. 6 illustrates an RSN Extension element (RSNXE) defined by the IEEE 802.11. The RSNXE is stored in a management frame complying with the IEEE 802.11.

Fields illustrated in FIG. 6 include, from the beginning, an Element ID field 601, a Length field 602, and an Extended RSN Capabilities field 603.

An SAE hash-to-element subfield 606 indicates that a Hash to Element (H2E) method is supported among SAE authentication methods defined by the WPA3. An SAE-PK subfield 607 indicates that an SAE Public Key (SAE-PK) method is supported among the SAE authentication methods.

The SAE hash-to-element is one of authentication methods of SAE, and can preliminarily calculate a parameter to be exchanged offline. This can prevent side channel of estimating a calculated value based on a computing time, and security can be enhanced.

Thus, for example, in the case of constructing a network including 6 GHz via multi-link communication, the SAE hash-to-element subfield 606 or the SAE-PK subfield 607 may be always enabled. Thus, by always enabling an SAE hash-to-element when 6 GHz is included via multi-link communication, the communication apparatus 102 becomes able to construct a network with higher safety. In contrast, the communication apparatus 102 becomes able to determine that connection is not to be established, assuming that an AP that constructs a network including 6 GHz via multi-link communication when the SAE hash-to-element is disabled is unreliable. In contrast, when an STA incompatible with an SAE hash-to-element transmits a connection request, an AP can determine that connection is not to be established, assuming that the STA is unreliable.

In addition, the SAE-PK is one of authentication methods of SAE, and is a method that can confirm whether an STA tries connection with an appropriate AP. In a case where an AP with which an STA tries to establish connection is an inappropriate AP, by the STA verifying a value, it becomes possible to determine that the AP is an inappropriate AP. This can contribute to security improvement in a public wireless LAN. Thus, by always enabling the SAE-PK when 6 GHz is included via multi-link communication, the communication apparatus 102 becomes able to construct a network with higher safety. In contrast, the communication apparatus 102 becomes able to perform control in such a manner as to avoid connection, assuming that an AP that constructs a network via multi-link communication although the SAE-PK is disabled is unreliable. In addition, furthermore, when an STA being incompatible with the SAE-PK transmits a connection request, an AP can perform control in such a manner as to avoid connection, assuming that the STA is unreliable.

In addition, as for the Password ID, the SAE hash-to-element, and the SAE-PK described above, as a connection determination condition of an AP and an STA, connection may be established only in a case where any of these is supported, and connection establishment may be avoided in a case where none of these are supported.

(Flow of Processing)

First Exemplary Embodiment

FIG. 7 illustrates processing of performing control in such a manner as to perform authentication or cipher using the WPA3, in a case where 6 GHz is selected as a frequency band to be used when multi-link communication is executed, by the control unit 202 executing a program stored in the storage unit 201 of the communication apparatus 101. The communication apparatus 101 includes a wireless LAN control unit that can at least execute multi-link communication.

The processing illustrated in the flowchart in FIG. 7 is started when the communication apparatus 101 constructs a network, or when the user issues an instruction to change a network setting.

First, in step S701, the communication apparatus 101 displays a wireless setting screen to the user. The screen to be displayed at the time will be described below with reference to FIGS. 8 to 19. Next, in step S702, the communication apparatus 101 determines whether 6 GHz is selected as a frequency band in which communication is to be executed, in a setting item on the screen. Because "basic (6 GHz) is selected in FIG. 8, in step S702, the communication apparatus 101 can determine that 6 GHz is selected. The determination method in step S702 in FIG. 9 and subsequent diagrams will be described below. In a case where it is determined in step S702 that a setting screen for 6 GHz is selected (YES in step S702), the processing proceeds to step S710. In step S710, only WPA3 and OWE are made selectable as security methods in the setting on a graphical user interface (GUI). More specifically, only WPA3-SAE or WPA-EAP is included in the AKM Suite List field 408 included in an RSNE, and a Beacon, a Probe Response, or an Association Response is transmitted.

Figure 8:
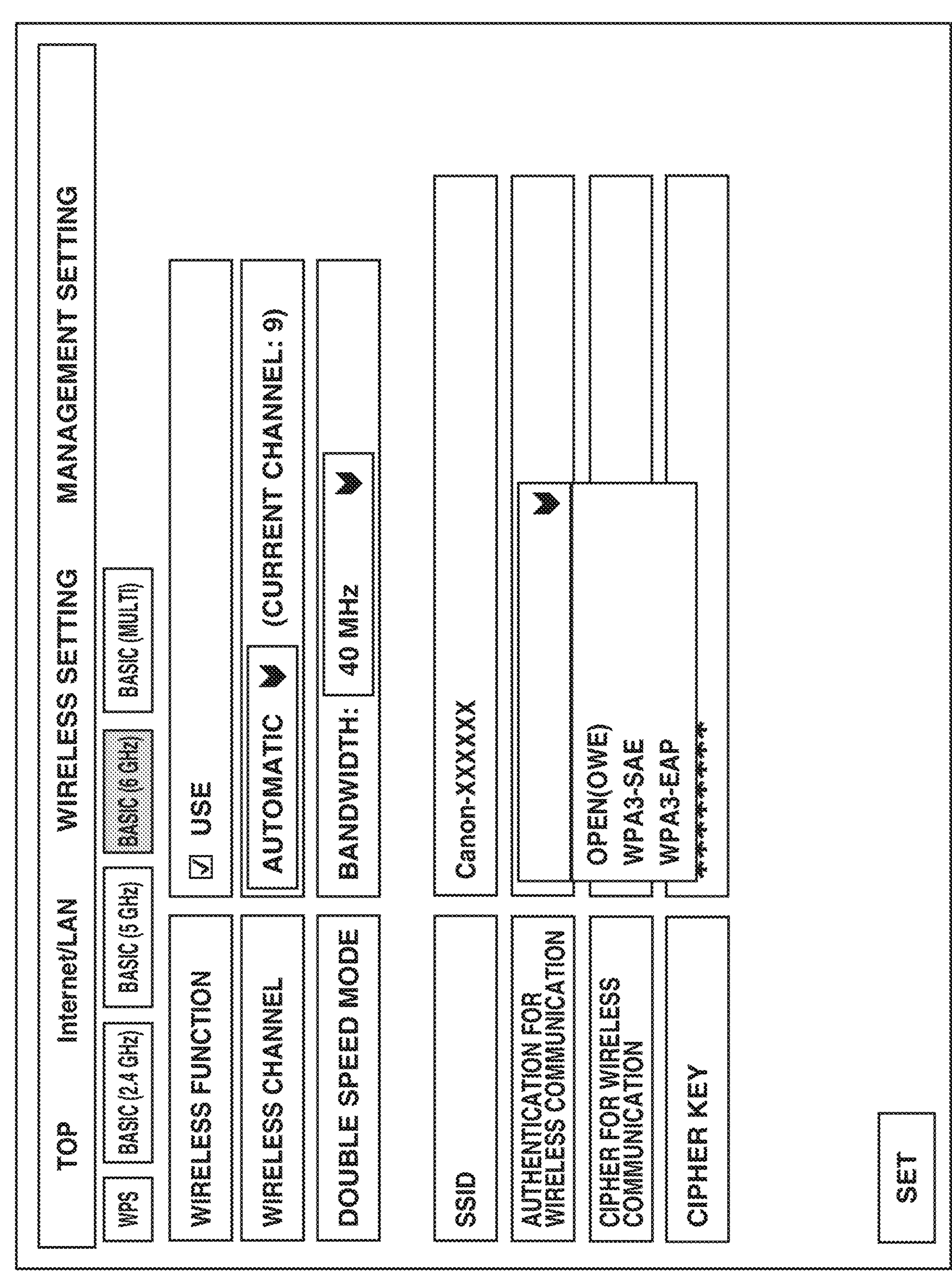
FIG. 8 illustrates an example of graphical user interface display according to the present invention.

FIG. 8 illustrates an example of a GUI to be displayed at the time. FIG. 8 illustrates a screen for setting network construction at 6 GHz. Because authentication needs to be performed using WPA3 in communication in the 6-GHz band, the WPA3 is displayed as a security method illustrated in FIG. 8. In addition, it is defined that authentication that uses WPA/WPA2 or OPEN is not used in the 6-GHz band. Thus, only OPEN (AES), WPA3-SAE, and WPA3-EAP are displayed in a selectable state as an authentication/cipher method of wireless communication. The display method used at the time is not limited to this. In addition, for example, the OPEN (AES) may be represented as Opportunistic Wireless Encryption (OWE), OPEN (with cipher), OPEN (OWE), OWE (communication cipher without password), or OWE (OPEN). The Opportunistic Wireless Encryption (OWE) is one of security methods, and it becomes possible to cipher communication even in an environment in which a password is not used. Thus, security is enhanced as compared with conventional OPEN by which communication content is not ciphered.

Another representation method may be used to represent WPA3-SAE. For example, the WPA3-SAE may be represented as WPA3-Personal, WPA3, SAE, or WPA3 (AES). Another representation method may be used to represent WPA3-EAP. For example, the WPA3-EAP may be represented as WPA3-Enterprise, WPA3, or WPA3-Enterprise (192 bit). Choices may be separately provided for WPA3-Enterprise and WPA3-Enterprise (192 bit).

As a choice of authentication methods illustrated in FIG. 8, a part of the authentication method illustrated in FIG. 8 may be displayed. For example, only WPA3-SAE may be provided as a choice. In this case, on the setting screen for 6 GHz, without providing choices corresponding to WPA3 on a display unit as illustrated in FIG. 8, cipher may be performed based on a cipher method determined in advance. The number of choices of authentication methods illustrated in FIG. 8 may be further increased. For example, WPA3-SAE (H2E), WPA3-SAE-PK, WPA3-SAE (Password ID), WPA4, and the like may be included in choices. Nevertheless, WEP, WPA-TKIP, WPA-AES, WPA2-TKIP, WPA2-AES, and a representation method representing methods equivalent to these are not included in choices, or displayed in an unselectable state.

In a case where it is determined in step S702 that the setting screen for 6 GHz is not selected (NO in step S702), the processing proceeds to step S703. In step S703, the communication apparatus 101 determines whether a setting screen for performing multi-link communication is selected. The description will be given with reference to FIG. 8. In the determination in step S703, for example, the communication apparatus 101 determines whether "basic (multi)" is selected in an upper tab. Here, in a case where it is determined in step S703 that a setting screen for performing multi-link communication is not selected (NO in step S703), the processing proceeds to step S713. In step S713, the communication apparatus 101 displays, as an authentication/cipher method of wireless communication that is to be displayed on the GUI, methods including methods equal to or earlier than the WPA2, in a selectable state aside from WPA3 and OWE. In addition, WPA2-AES is included in the AKM Suite List field 408 included in the RSNE illustrated in FIG. 4, and a beacon, a Probe Response, or an Association Response is transmitted.

Figure 9:
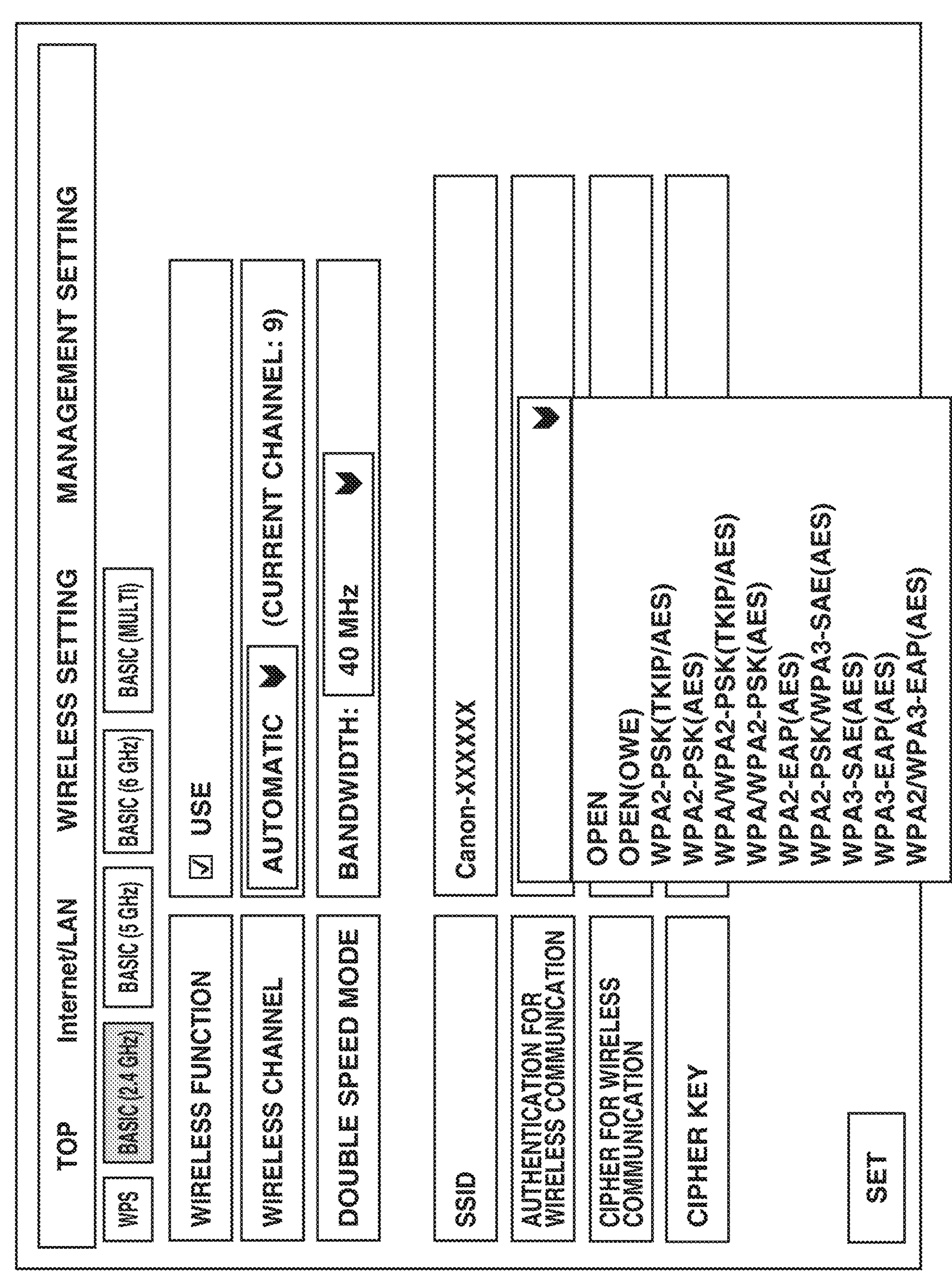
FIG. 9 illustrates an example of graphical user interface display according to the present invention.

FIG. 9 illustrates an example of a GUI to be displayed in a case where it is determined at the time (i.e., in step S703) that a setting screen for performing multi-link communication is not selected. In FIG. 9, "basic (2.4 GHz)" is selected as a setting screen of a network to be constructed, and it can be seen that the displayed screen is a screen for setting network construction at 2.4 GHz. In this case, in a case where a screen for setting network construction at 2.4 GHz is selected, such case a case where a screen for constructing a single network is selected, in step S703, it is determined that a setting screen for performing multi-link communication is not selected. In a case where it is determined in step S703 that a setting screen for performing multi-link communication is not selected (NO in step S703), as illustrated in FIG. 9, as an authentication/cipher method of wireless communication, OPEN and methods equal to or earlier than the WPA2 are displayed in a selectable state aside from OPEN (AES), WPA3-SAE, and WPA3-EAP. That is, in a case where it is determined in step S703 that a setting screen for performing multi-link communication is not selected (NO in step S703), the processing proceeds to step S713. In step S713, authentication methods including authentication methods equal to or earlier than the WPA2 are displayed in a selectable state.

As the display of authentication methods illustrated in FIG. 9, choices may be changed depending on the function included in an AP. For example, in a case where an AP does not support EAP, WPA2-EAP(AES), WPA3-EAP(AES), and WPA2/WPA3-EAP(AES) may be excluded from the choices illustrated in FIG. 9.

In addition, for example, in a case where an AP does not support Personal, only OPEN and EAP may be displayed. Alternatively, methods other than OPEN may be displayed as choices. The description of (TKIP/AES) and (AES) may be omitted. In addition, the WPA2-PSK/WPA3-SAE may be represented in a different way. For example, the WPA2-PSK/WPA3-SAE may be represented as WPA2/WPA3 or WPA2/PA3-Personal. Similarly, the WPA3-SAE may be represented as WPA3, WPA3-Personal, or WPA3-SAE (Personal).

The OPEN (AES) may be represented in a different way. For example, the OPEN (AES) may be displayed as OPEN (OWE) or OWE, and the WPA/WPA2-PSK may be displayed as MIX. In addition, WPA/WPA2/WPA3 may be described. This may be displayed as WPA-MIX.

Figure 10:
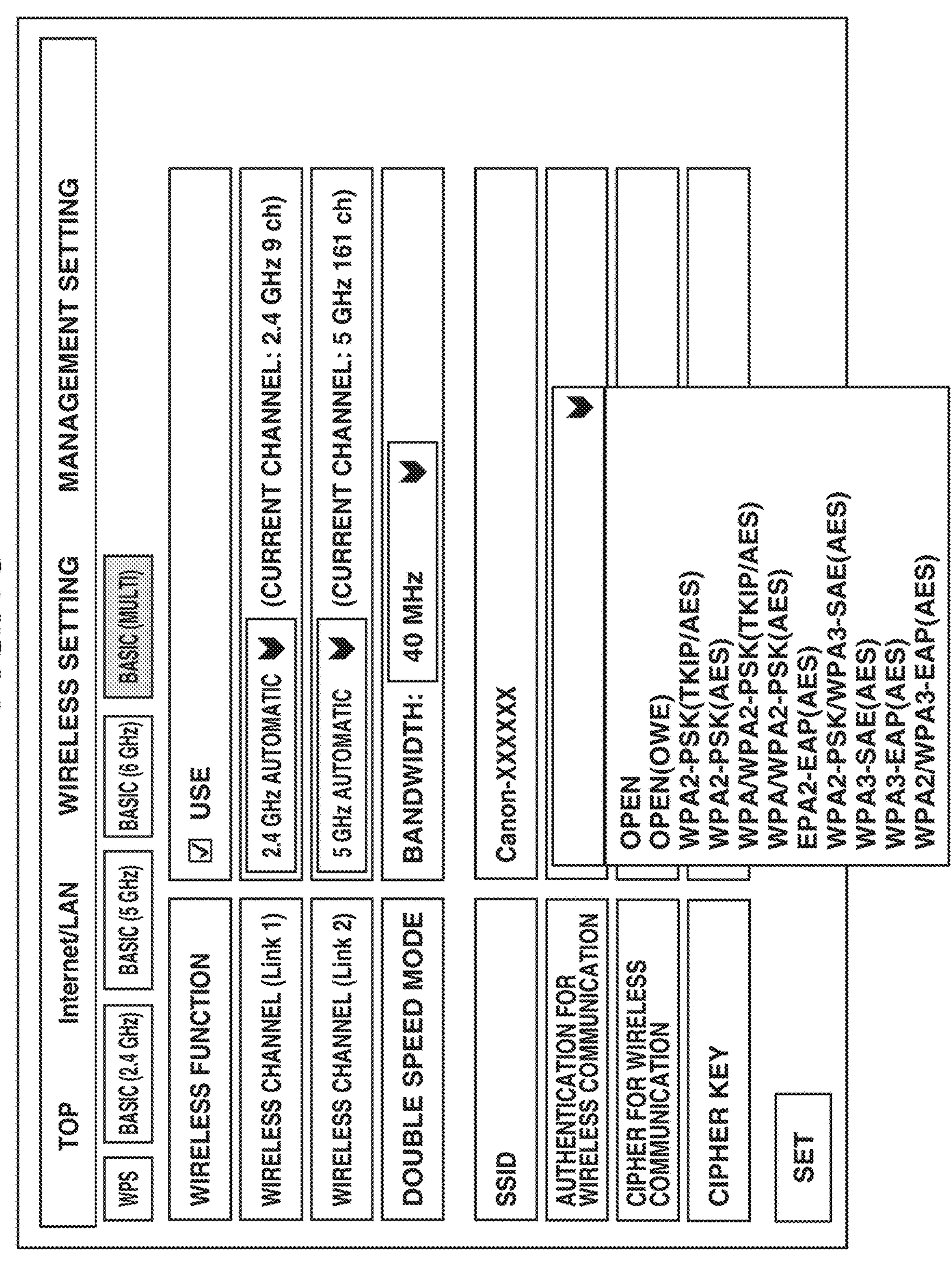
FIG. 10 illustrates an example of graphical user interface display according to the present invention.
Figure 11:
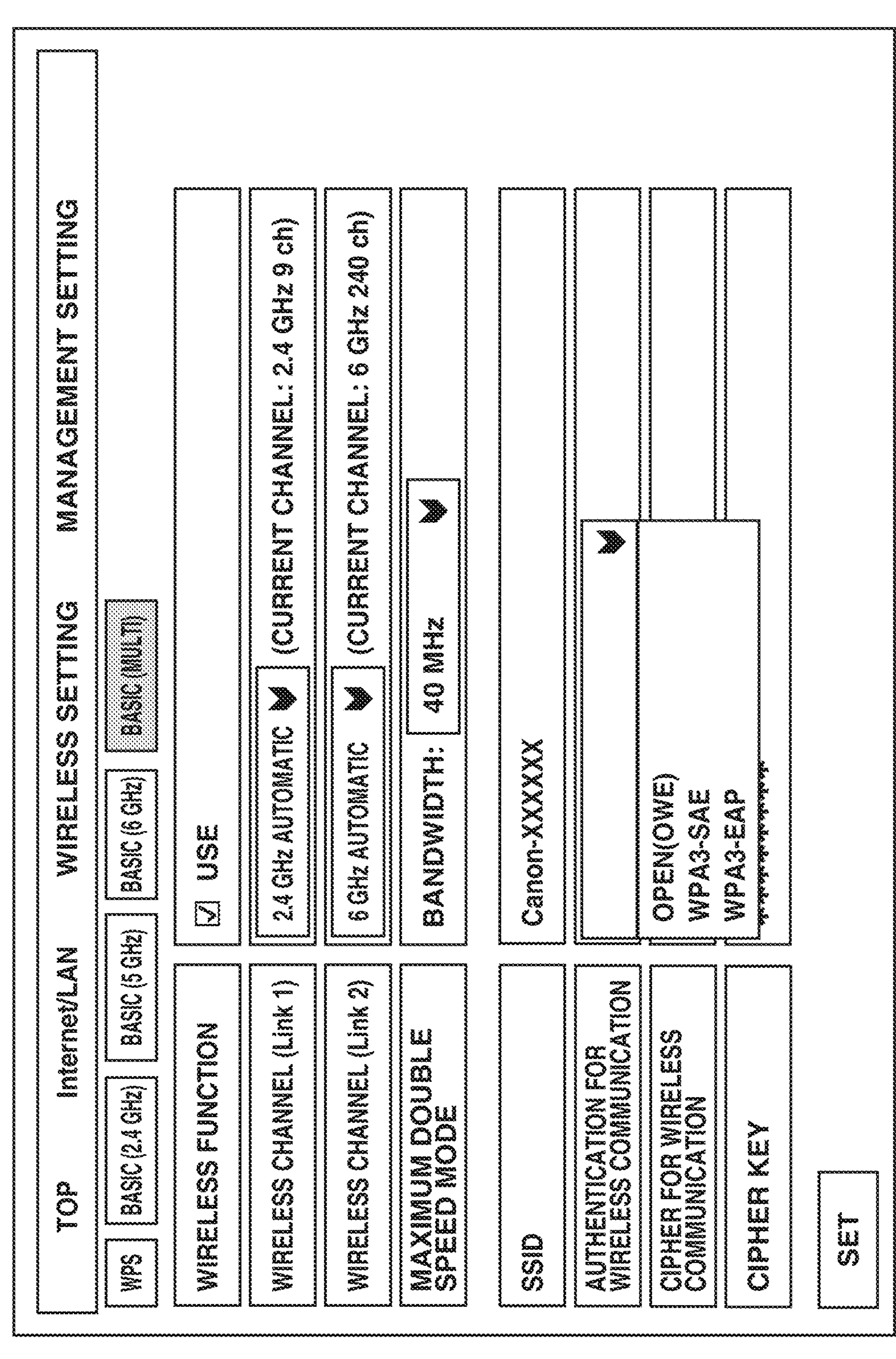
FIG. 11 illustrates an example of graphical user interface display according to the present invention.
Figure 12:
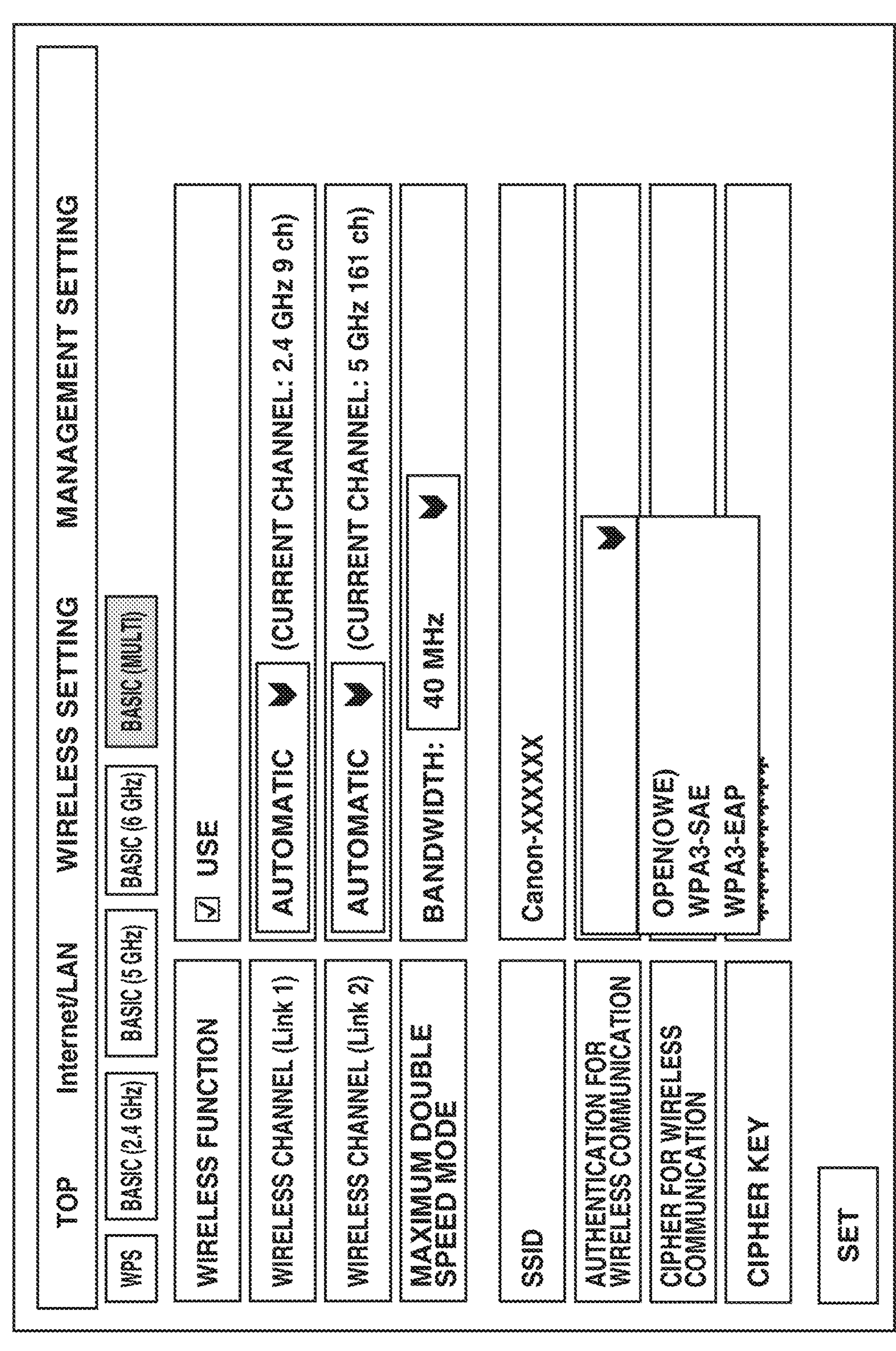
FIG. 12 illustrates an example of graphical user interface display according to the present invention.

In addition, by "basic (multi)" being selected as illustrated in FIG. 10, it may be determined that a setting screen for performing multi-link communication is selected. That is, by "basic (multi)", which means that multi-link communication is to be performed, being selected as illustrated in FIG. 10, in step S703, it is determined that a setting screen for performing multi-link communication is selected. At the time, in step S704, the communication apparatus 101 determines whether there is a possibility that at least one link includes a frequency channel operating in the 6-GHz band. The determination in step S704 is made depending on whether a frequency band of 6 GHz is designated as a frequency band of a channel to be set for each link, and a specific channel in the frequency band of 6 GHz is designated as illustrated in FIG. 10, for example. For example, in FIG. 10, "2.4 GHz automatic" is selected as a Link 1, and "5 GHz automatic" is selected as a Link 2. It can be seen that, at this time, an operation at 6 GHz is not executed in multi-link communication. That is, it can be seen from FIG. 10 that the execution of multi-link communication in the 2.4-GHz band and the 5-GHz band is selected, and multi-link communication is not performed in the 6-GHz band. In this case, it is determined in step S704 that there is no possibility that a frequency channel operating at 6 GHz is included. On the other hand, in the case of FIG. 11, "2.4 GHz automatic" is selected as a Link 1, and "6 GHz automatic" is selected as a Link 2. In this case, it is determined in step S704 that 6 GHz is included as a channel operating in multi-link communication. In addition, also in a case where a channel is set to "automatic" and an operation is made executable in all band as illustrated in FIG. 12, it may be determined that there is a possibility that an operation is executed at 6 GHz.

In a case where it is determined that there is no possibility that an operation is executed at 6 GHz (NO in step S704), the processing proceeds to step S713. In step S713, methods including methods equal to or earlier than the WPA2 are displayed in a selectable state. The display method to be used at the time is the method as illustrated in FIG. 10, for example. Because choices of authentication/cipher methods are similar to the choices described above with reference to FIG. 9, the description will be omitted. Although FIG. 10 illustrates a setting screen for multi-link communication, because communication that uses the 6 GHz frequency band is not selected, in addition to authentication methods equal to or earlier than the WPA2, WPA3 is displayed as a choice of an authentication method.

In a case where it is determined that there is a possibility that 6 GHz is included (YES in step S704), the processing proceeds to step S705. In step S705, the communication apparatus 101 checks whether an already-connected STA exists. In addition, the determination in step S705 may be executed immediately before step S701, or the execution may be omitted. In a case where an STA that has established connection does not exist (NO in step S705), the processing proceeds to step S710. In step S710, the communication apparatus 101 performs control in such a manner that only OPEN (AES) and WPA3 are displayed. Because choices of authentication/cipher methods are similar to the choices described above with reference to FIG. 8, the description will be omitted.

Figure 13:
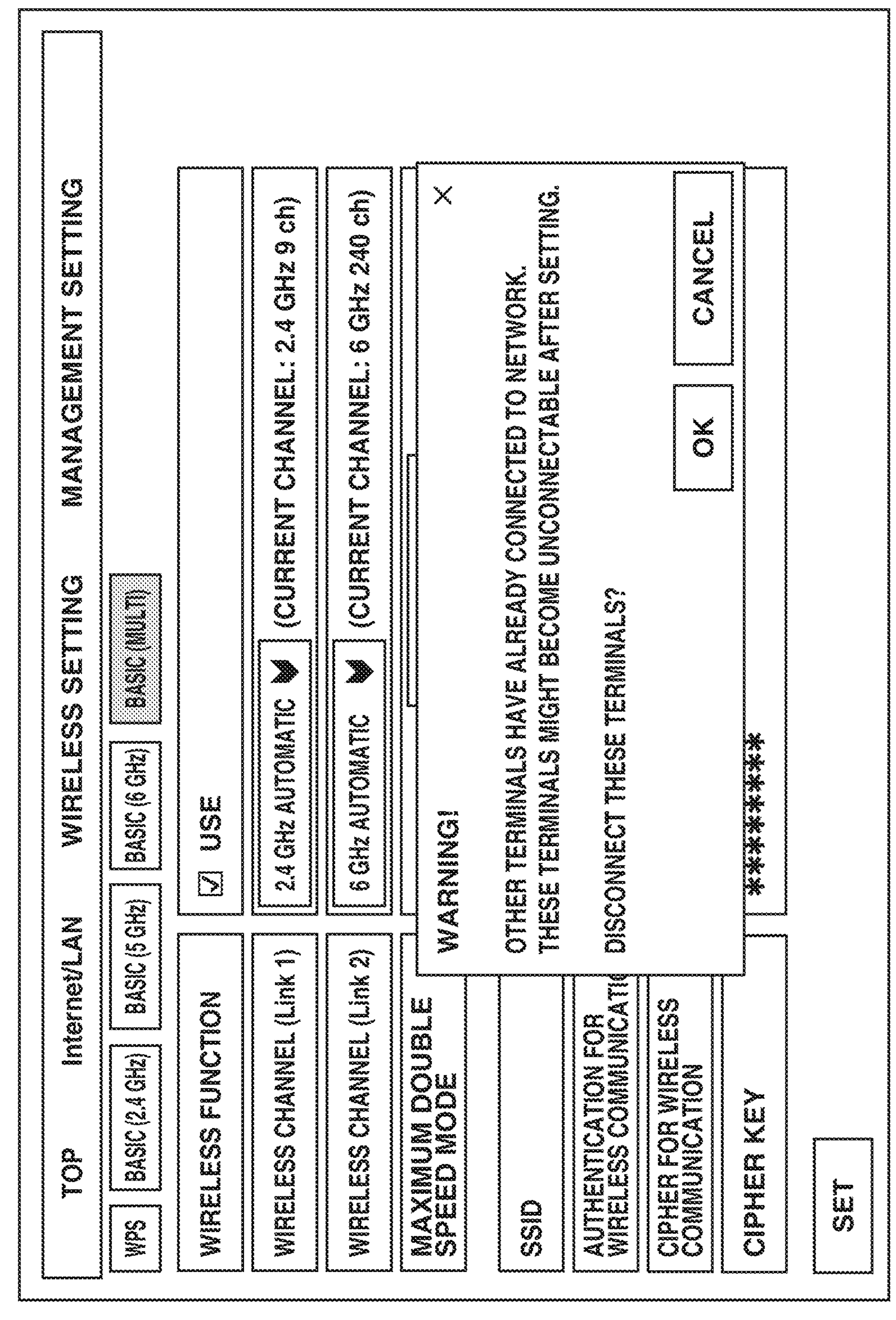
FIG. 13 illustrates an example of graphical user interface display according to the present invention.

In a case where an STA that has established connection at a setting update time point exists (YES in step S705), the processing proceeds to step S706. In step S706, the communication apparatus 101 determines whether the STA that has established connection has established connection using an authentication/cipher method equal to or earlier than the WPA2. In a case where it is determined in step S706 that the STA has established connection using an authentication/cipher method equal to or later than the WPA3 (NO in step S706), the processing proceeds to step S710. In step S710, only the WPA3 is displayed in a selectable state. In a case where it is determined in step S706 that the STA has established connection using an authentication/cipher method equal to or earlier than the WPA2 (YES in step S706), because a network is constructed using only the WPA3 by 6 GHz being selected after a setting change, the STA has already established connection using an authentication/cipher method equal to or earlier than the WPA2 might become unable to reconnection. Thus, the processing proceeds to step S707, and in step S707, a warning as illustrated in FIG. 13 is displayed. Here, in a case where "OK" indicating that the warning is accepted has been pressed in the warning, warning (YES in step S708), the processing proceeds to step S710. In step S710, the STA that has established connection is disconnected, and only the WPA3 is displayed in a selectable state. In addition, the disconnection with the STA that has established connection may be executed at a timing (step S711) at which a "set" button to be described below is pressed. In a case where "cancel" is pressed instead of "OK" being pressed in the warning illustrated in FIG. 13, or in a case where the screen is closed as-is (NO in step S708), the processing proceeds to step S709. In step S709, a setting is changed to a setting of constructing a network not including 6 GHz. In step S709, for example, it is considered to change 6 GHz selected in FIGS. 11, to 5 GHz as illustrated in FIG. 10. In addition, in steps S707 to S709, it may be selected to construct a network separately from an existing network (i.e., network that has already established connection with an STA). In this case, a choice of an authentication/cipher method is displayed in such a manner that the WPA3 is always selected. The existing network is managed on a different screen.

Figure 14:
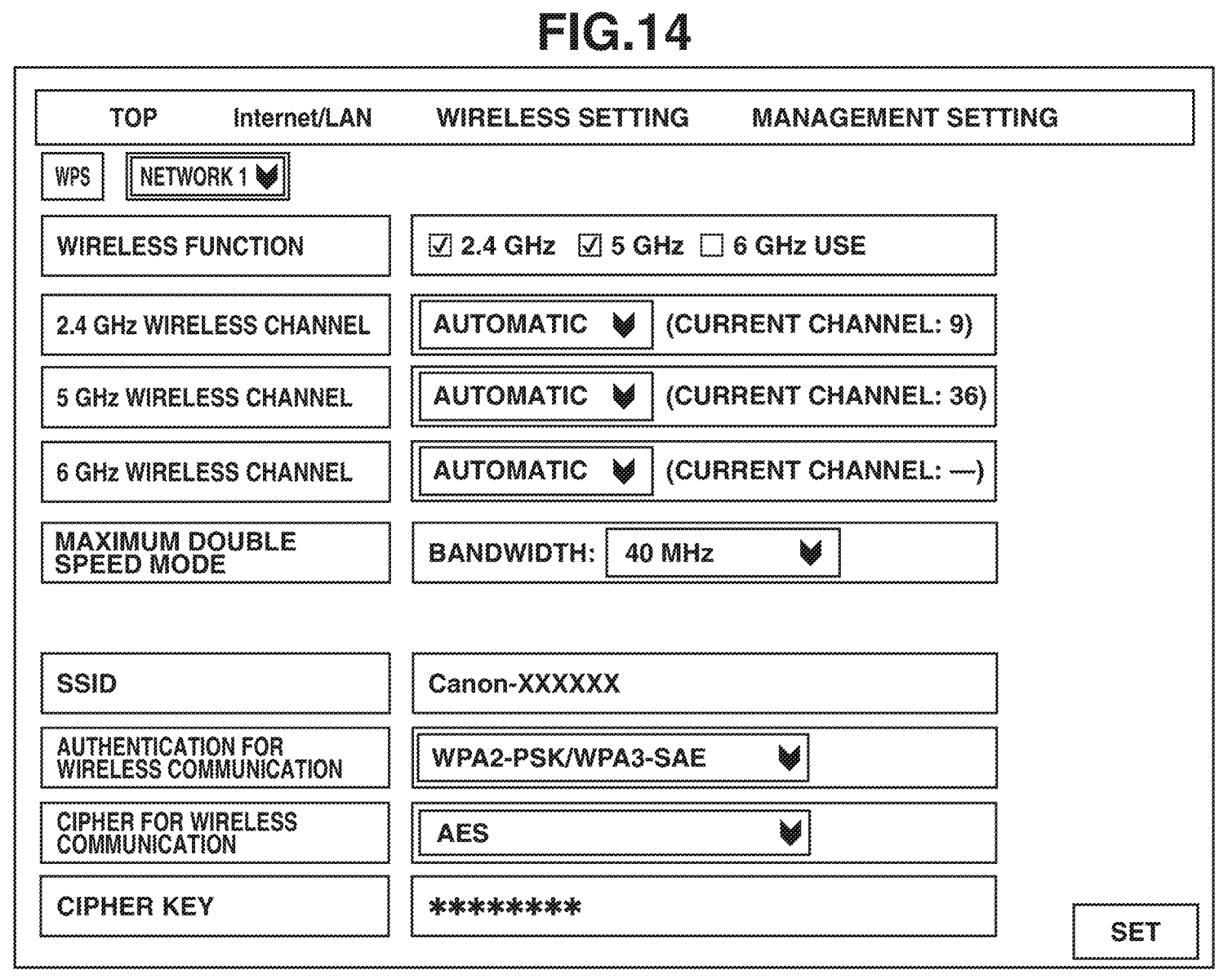
Figure 15:
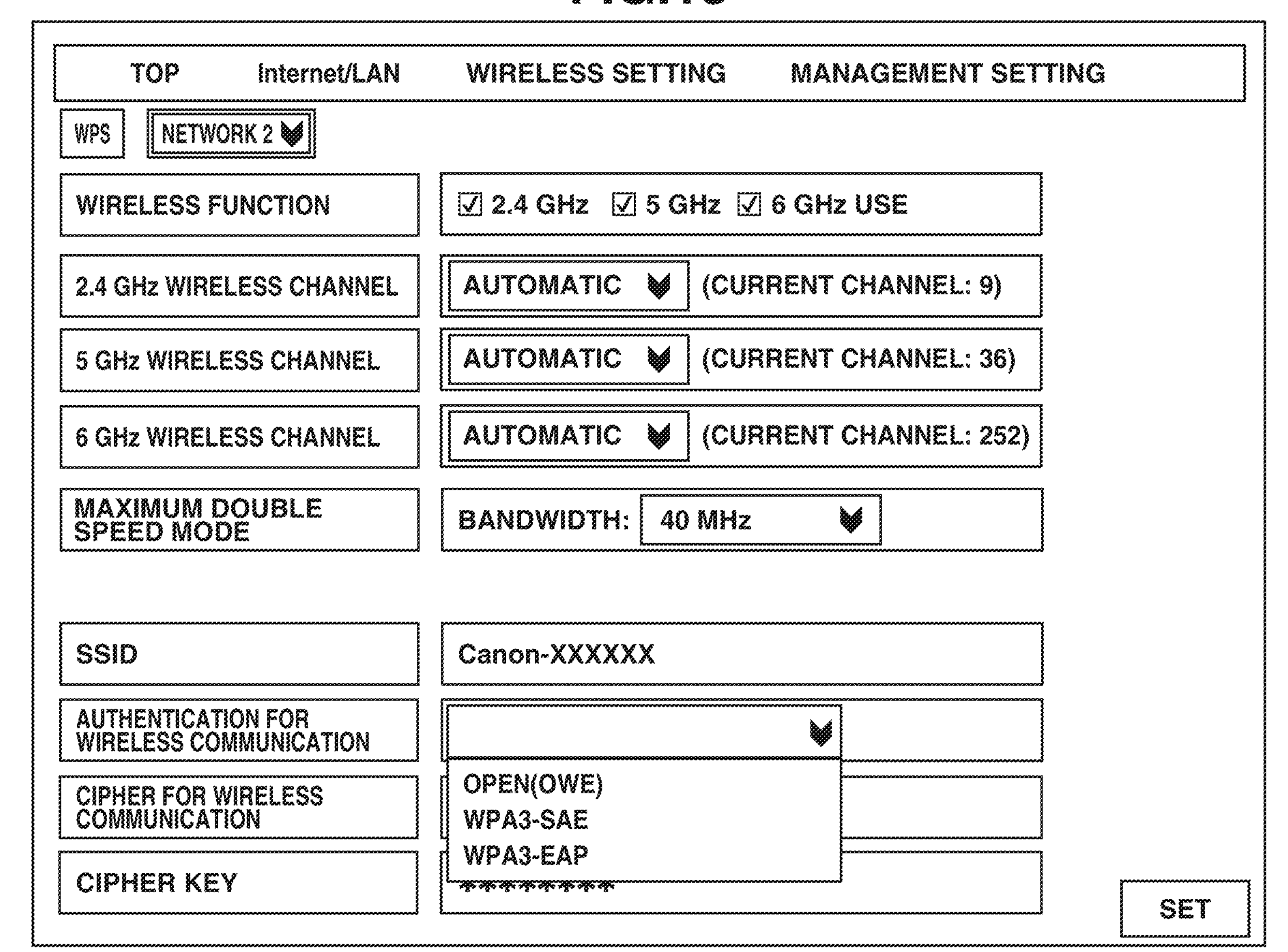
FIG. 15 illustrates an example of graphical user interface display according to the present invention.

FIGS. 14 and 15 each illustrate an example in this case. At the state of step S703, a setting screen illustrated in FIG. 14 is displayed, and in a case where the user has selected an operation at 6 GHz in this state (YES in step S704), in step S705, the communication apparatus 101 determines whether an STA has established connection in the existing network. In a case where an STA that has already established connection exists, in step S707, a warning is displayed, and the screen transitions to a screen illustrated in FIG. 15. Here, a warning text to be displayed in step S707 is confirmation such as "newly construct network?", for example. In other words, in step S707, it is confirmed with the user that a network different from the existing network is to be constructed. If the user accepts the warning and presses "OK", while maintaining the setting of a "network 1" illustrated in FIG. 14, a "network 2" is newly constructed, the 6-GHz band is also added, and a setting screen as illustrated in FIG. 15 is displayed. It can be seen that, while 6 GHz is not ticked in the setting of the network 1 in FIG. 14, the network changes to the "network 2" and the 6-GHz band is ticked in FIG. 15. That is, by the user accepting that a network different from the existing network is to be constructed, in addition to the existing network (2.4 GHz/5 GHz), a network at 6 GHz that corresponds to the network 2 is constructed. In addition, because an operation is executed at 6 GHz in FIG. 15, authentication/cipher methods to be displayed are limited to OPEN(AES) and WPA3-SAE. That is, only WPA3-SAE or WPA-EAP is included in the AKM Suite List field 408 included in an RSNE, and a Beacon, a Probe Response, or an Association Response is transmitted. Alternatively, in a case where the present invention is applied to the communication apparatus 102, the authentication/cipher method is granted to an RSNE of a Probe Request or an Association Request.

If a network has been constructed using the WPA3-SAE, the communication apparatus 101 waits for a connection request from a counterpart apparatus. Alternatively, in a case where the present invention is applied to the communication apparatus 102, the communication apparatus 102 searches for a counterpart apparatus, and transmits a connection request to a counterpart apparatus satisfying a condition. Here, the connection request refers to a Probe Request or an Association Request.

In a case where the communication apparatus 101 has received a connection request from a counterpart apparatus in step S712, in step S716, the communication apparatus 101 determines whether the counterpart apparatus has transmitted the connection request via multi-link communication, and has transmitted the connection request using the WPA3. Specifically, the communication apparatus 101 checks whether the AKM Suite List field 408 of the Probe Request or the Association Request received in step S712 stores information indicating that the WPA3 is supported. In a case where it is determined in step S716 that the counterpart apparatus has transmitted the connection request via multi-link communication not using the WPA3 (NO in step S716), the processing proceeds to step S717. In step S717, the communication apparatus 101 refuses connection. Here, in step S717, another network may be recommended. Alternatively, if the connection request is a request for connection including only 2.4 GHz and 5 GHz although the connection request is transmitted via multi-link communication, the processing may proceed to processing of advancing authentication in response to a connection request transmitted using the WPA2. Nevertheless, in this case, if a request to add 6 GHz is issued afterward, the request is always refused.

In addition, in a case where a Password ID, an SAE hash-to-element, and SAE-PK are required in connection including 6 GHz in multi-link communication, as described above, in addition to the determination of WPA3, these may be used as a condition of connection acceptance. In a case where the present invention is applied to the communication apparatus 102, when the communication apparatus 102 searches for an AP, the communication apparatus 102 transmits a connection request only to an AP that constructs a network satisfying the above-described condition.

In a case where a connection request from an STA satisfies the condition, in step S718, the communication apparatus 101 advances the authentication of the STA. If the authentication in step S718 has succeeded (YES in step S719), the processing proceeds to step S720. In step S720, the communication apparatus 101 connects with a counterpart apparatus and starts communication. If the authentication has not succeeded (NO in step S719), the processing proceeds to step S717. In step S717 the communication apparatus 101 refuses connection. As a method of refusing connection in step S717, it is possible to set a Status Code in an Association Response to Failure.

In step S714, by the set button being pressed after the processing in step S713, a network is constructed using a set authentication/cipher method. In this example, it is assumed that WPA2-PSK/WPA3-SAE is selected.

In step S713, the AKM Suite List field 408 of the RSNE illustrated in FIG. 4 includes 00-0F-AC-02 and 00-0F-AC-06 being values indicating that the PSK is applicable, in addition to 00-0F-AC-08 being a value indicating that the SAE is applicable. The 00-0F-AC-02 indicates that SHA-128 is used as a hash function in the PSK, and the 00-0F-AC-06 indicates that SHA-256 is used as a hash function. Either one of these may be included.

After the network has been constructed, in step S715, the communication apparatus 101 waits for a connection request to be transmitted from a counterpart apparatus. If the counterpart apparatus has transmitted a connection request, in step S718, the communication apparatus 101 advances authentication, and if the authentication has succeeded (YES in step S719), the processing proceeds to step S720. In step S720, the communication apparatus 101 connects with the counterpart apparatus and starts communication. If the authentication has not succeeded (NO in step S719), the processing proceeds to step S717. In step S717, the communication apparatus 101 refuses connection.

According to the present exemplary embodiment, in a case where 6 GHz is included in multi-link communication, by controlling display in such a manner that authentication is performed using the WPA3 in both links, in the communication executed at 6 GHz, it becomes possible to continue communication limited to WPA3. In addition, in a case where the 6-GHz band is not included, by enabling communication established using the WPA2, also a device not supporting the existing WPA3 becomes able to participate in the network and execute communication. In addition, aside from the above-described method, a display method for a GUI can be considered. Hereinafter, a setting screen for an AP that can construct a plurality of networks will be exemplified.

Figure 16:
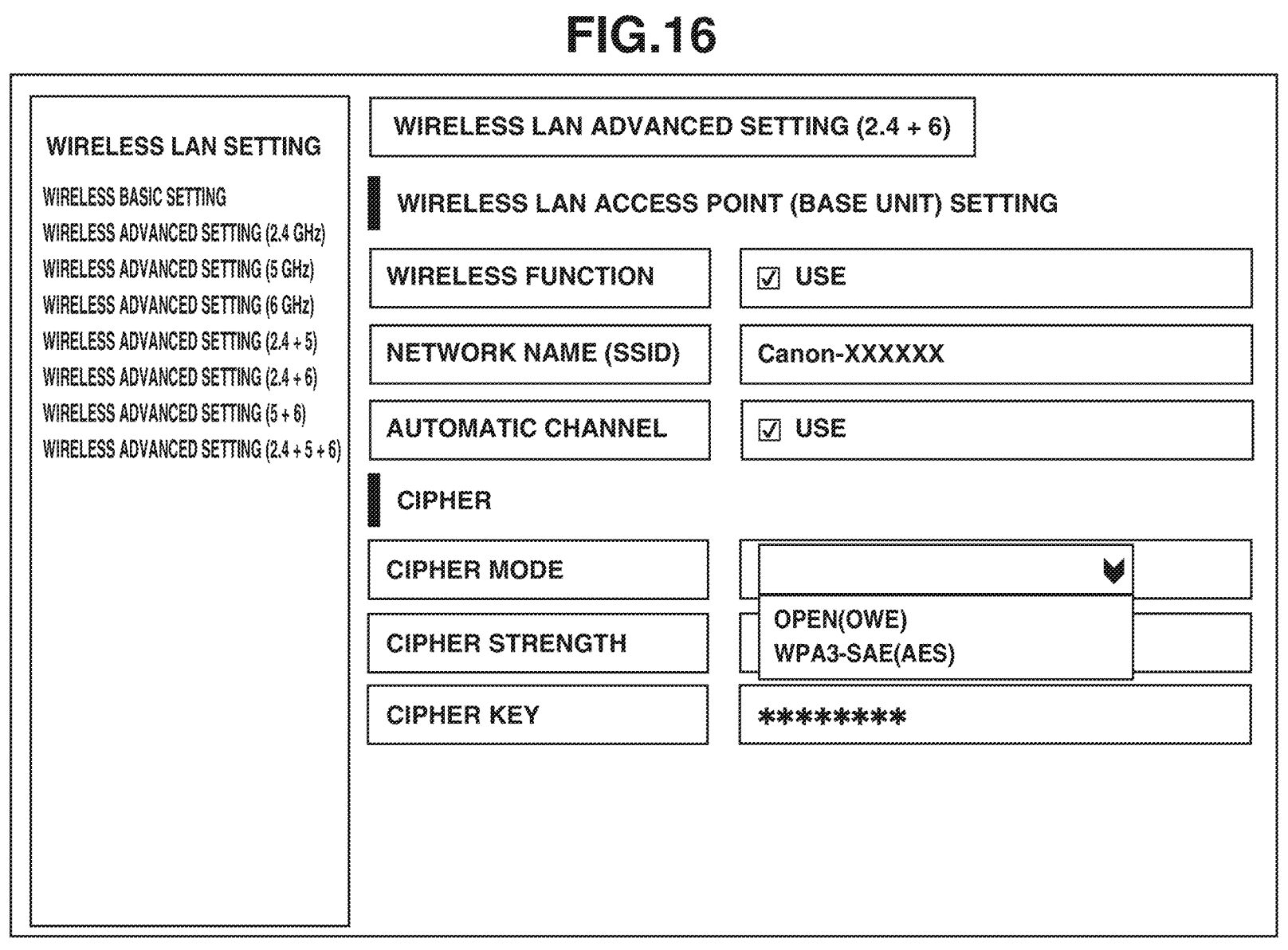

FIG. 16 illustrates an example of a GUI for an AP that can construct a plurality of networks. On the left side of the screen, types of networks are displayed. For example, in a wireless LAN advanced setting (2.4 GHz), choices including security methods equal to or earlier than the WPA2, and Open for performing network construction via a single link are displayed. On the other hand, in a case where a wireless LAN advanced setting (2.4+6) is selected as illustrated in FIG. 16, it is indicated that a network is constructed via multi-link communication at 2.4+6 GHz. In this case, because the execution of multi-link communication using the 6 GHz frequency band is selected, only OWE and WPA3 are displayed on a display unit in a selectable state, and security methods equal to or earlier than the WPA2, and Open are not displayed.

Figure 18:
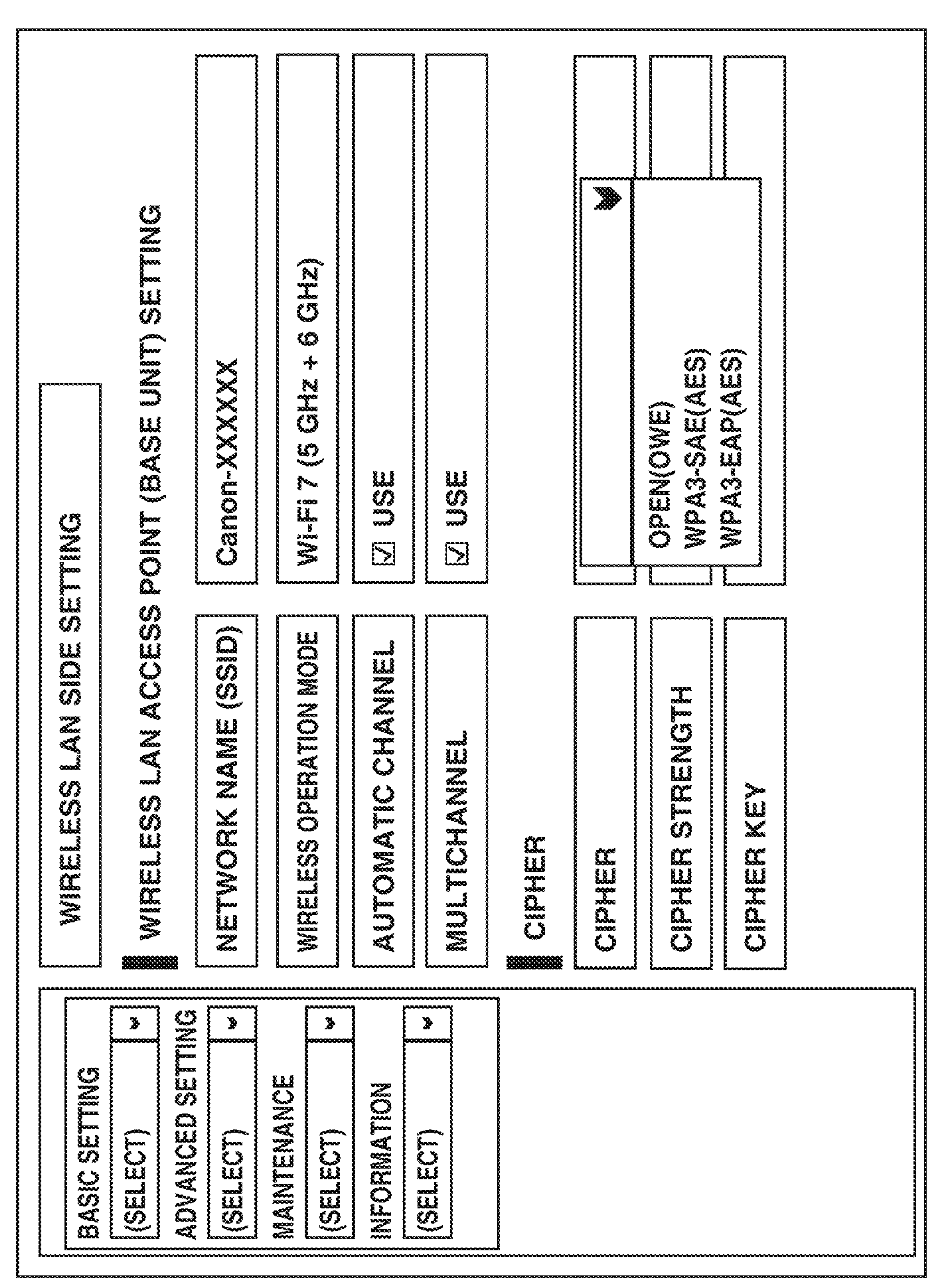
FIG. 18 illustrates an example of graphical user interface display according to the present invention.

FIGS. 17 and 18 each illustrates an example of a GUI for an AP that is to be displayed in a case where a frequency band is determined when an operation mode is selected. A difference lies in that, while a frequency band is determined in a wireless channel in FIG. 16, a frequency band is determined in an operation mode in FIGS. 17 and 18.

In a case where 2.4 GHz+5 GHz is selected as a wireless operation mode as illustrated in FIG. 17, in step S704, it can be determined that an operation at 6 GHz is not performed. That is, although the execution of multi-link communication is selected, because it is indicated that multi-link communication is performed not using 6 GHz, choices including WPA2 and Open are displayed as security methods.

In a case where 5 GHz+6 GHz is selected as a wireless operation mode as illustrated in FIG. 18, in step S704, it can be determined that an operation at 6 GHz is performed. That is, because it is indicated that multi-link communication is performed using 6 GHz, only OWE and WPA3 are displayed on the display unit in a selectable state, and security methods equal to or earlier than the WPA2, and Open are not displayed. In addition, for example, two frequency channels may be selected from the 6-GHz-band as frequency channels to be selected in multi-link communication. Alternatively, one frequency channel may be selected from the 2.4-GHz band and two frequency channels may be selected from the 6-GHz-band.

Figure 19:
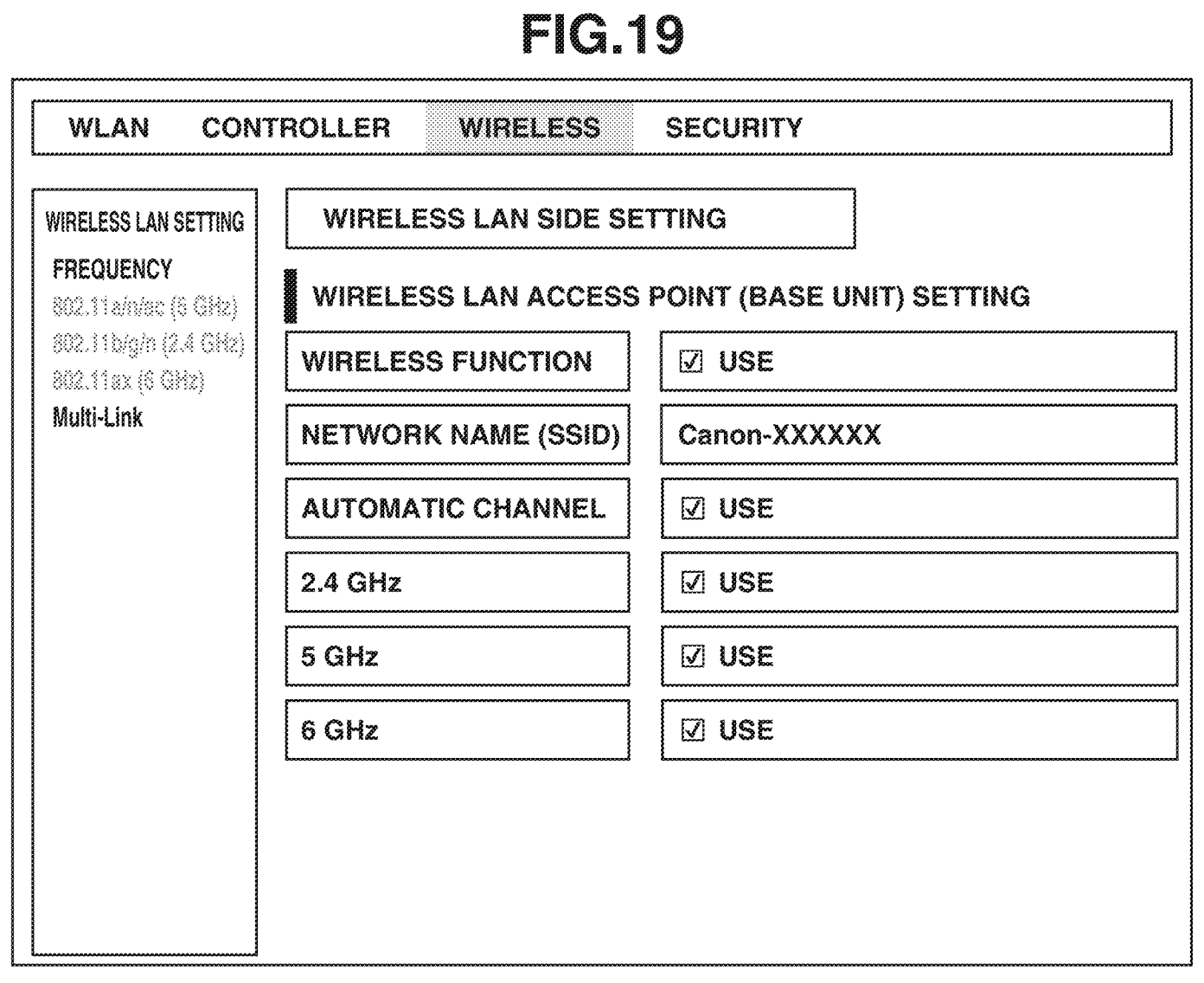
Figure 20:
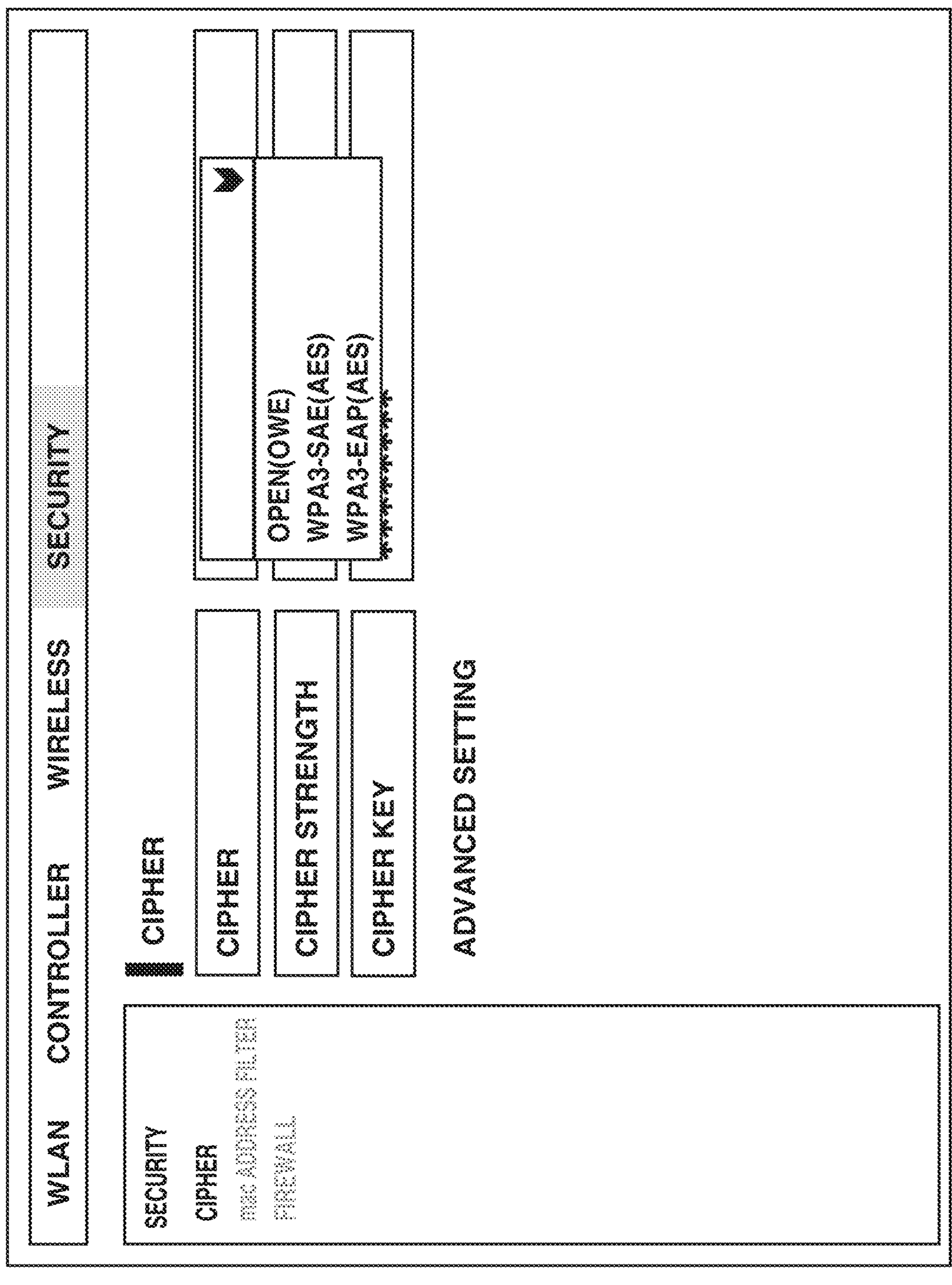
FIG. 20 illustrates an example of graphical user interface display according to the present invention.

FIGS. 19 and 20 illustrate an example of a UI for an AP, in which a screen for setting a frequency band in which an operation is to be performed via multi-link communication, and a screen for setting security are displayed as separate screens.

FIG. 19 illustrates a setting screen of multi-link communication. Because 6 GHz is ticked, in step S704, it is determined that an operation at 6 GHz is performed via multi-link communication. FIG. 20 illustrates an example in which the screen transitions in this case to a screen for setting a security method. Because it is determined that an operation at 6 GHz is performed via multi-link communication, on a security setting screen, only OWE and WPA3 are displayed on a display unit in a selectable state, and security methods equal to or earlier than the WPA2, and Open are not displayed. In addition, in a case where 6 GHz is not ticked in FIG. 19 and is determined that an operation at 6 GHz is not performed via multi-link communication, in addition to WPA3, choices including WPA2 and Open are displayed as security methods.

Figure 21:
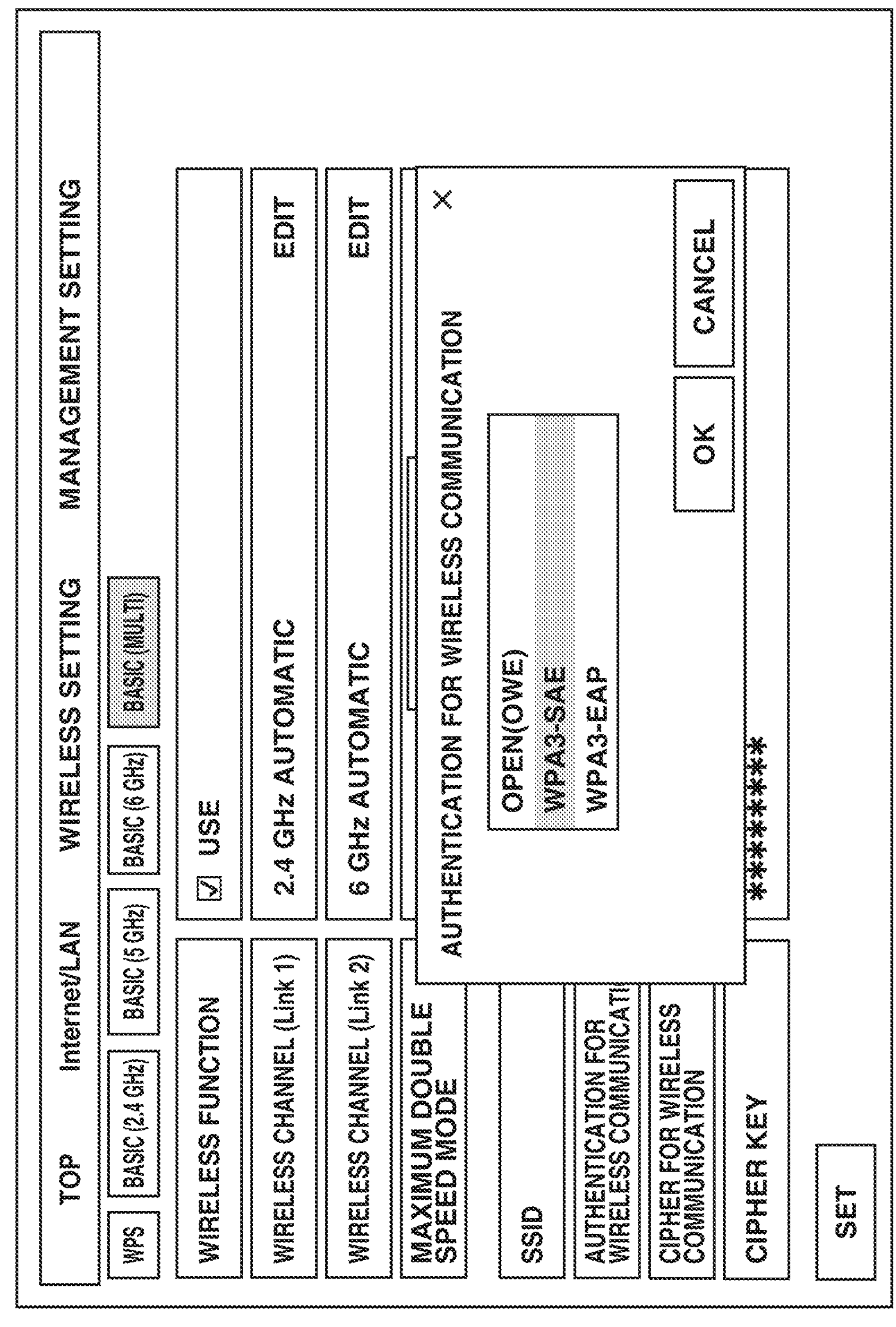
FIG. 21 illustrates an example of graphical user interface display according to the present invention.

FIG. 21 illustrates an example of a UI that is to be displayed in a case where choices pop out when a security method is to be selected. A selection method of a frequency band is similar to that described with reference to FIGS. 9 to 19. As illustrated in FIG. 21, when a security method is to be selected, choices may be displayed in a pop-out manner. In a case where multi-link communication including 6 GHz is selected, only OWE and WPA3 are displayed in a selectable state. On the other hand, in a case where multi-link communication not including 6 GHz is selected, choices including WPA2 and Open in addition to the WPA3 are displayed as security methods.

Figure 22:
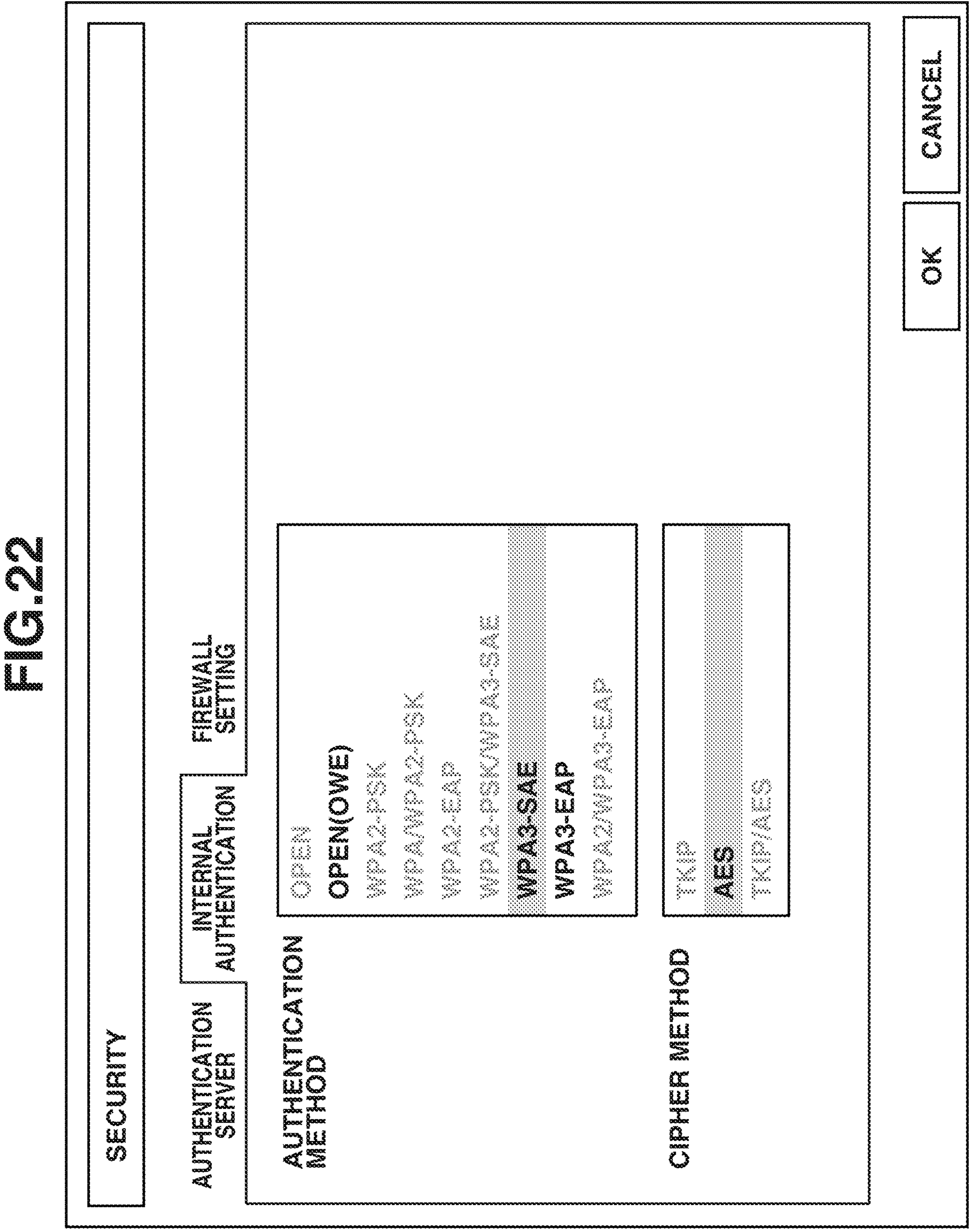
FIG. 22 illustrates an example of graphical user interface display according to the present invention.

FIG. 22 illustrates an example of a UI to be displayed in a case where control is performed in such a manner as to make a specific security method unselectable by displaying the specific security method in a grayout state. For example, in a case where multi-link communication including 6 GHz is selected, only WPA3 is displayed in a selectable state, and security methods equal to or earlier than the WPA2 are made unselectable by being displayed in a grayout state.

Figure 23:
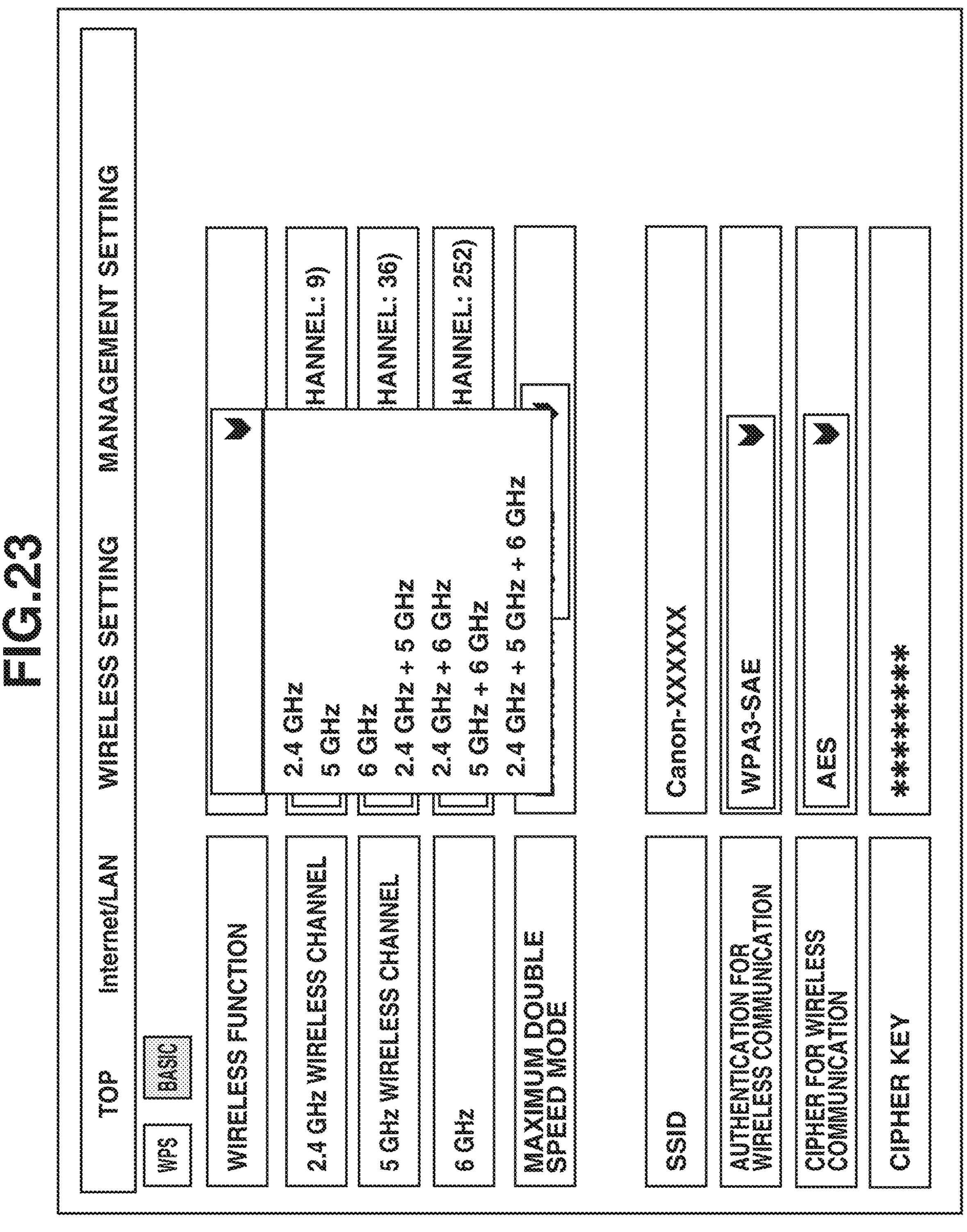
FIG. 23 illustrates an example of graphical user interface display according to the present invention.

FIG. 23 illustrates an example of a UI to be displayed in a case where a wireless channel to be used when a wireless function is selected is determined. For example, in FIG. 23, in a case where 2.4 GHz+5 GHz is selected, in step S704, it is determined that an operation is not performed in the 6-GHz band, and choices including WPA2 and Open in addition to WPA3 are displayed as security methods. On the other hand, for example, in a case where 2.4 GHz+6 GHz is selected, in step S704, it is determined that multi-link communication including 6 GHz is performed, and only OWE and WPA3 are displayed in a selectable state.

In this manner, by limiting a security method that can be selected from choices for the user also on a UI to be used during network construction, security improvement is achieved. In addition, communication authentication or cipher of which is performed using a method equal to or earlier than the WPA2 is prevented from being executed at 6 GHz at which authentication and cipher using a method equal to or earlier than the WPA2 are prohibited.

In addition, even when multi-link communication is selected on a UI, instead of changing choices to be provided as security methods, a communication apparatus may automatically switch a security method when actually constructing a network. For example, in a case where a plurality of networks is simultaneously constructed, it is assumed that WPA2/3 is selected on a UI. In a network in which 6 GHz is not used in multi-link communication, an operation may be performed using the WPA2/3, and in a network in which 6 GHz is used in multi-link communication, an operation may be performed using only the WPA3. In this case, at a time point at which 6 GHz is selected in multi-link communication, a choice only including WPA2 may be excluded, or a choice only including WPA2 may be made unselectable in all networks. In a case where multi-link communication is used also in this case, connection with a high security method is assured.

Second Exemplary Embodiment

In the present exemplary embodiment, the description will be given of a case where control is performed in such a manner as to perform authentication or cipher using the WPA3 in a case where 6 GHz is selected in multi-AP communication.

FIG. 24 illustrates a flow of processing to be executed when 6 GHz is selected in multi-AP communication, by the control unit 202 executing a program stored in the storage unit 201 of the communication apparatus 101.

The multi-AP communication is a technique of enabling communication performance improvement such as communication rate enhancement and radio wave interference reduction that uses beam forming, by a plurality of APs performing a cooperative operation and performing data communication with an STA. APs that participate in multi-AP communication are classified into one Sharing AP that manages other APs, and Shared APs operating under the management of the Sharing AP.

In addition, the description of points that have already been described in the above-described exemplary embodiment will be omitted in the present exemplary embodiment.

FIG. 24 illustrates a flowchart of processing for selecting a security method based on a communication format to be used when the communication apparatus 101 connects with the communication apparatus 102 in the present exemplary embodiment.

The communication apparatus 101 includes a wireless LAN control unit that can at least execute multi-AP communication.

The processing illustrated in the flowchart in FIG. 24 is started when the communication apparatus 101 constructs a network, or when the user issues an instruction to change a network setting.

Because most of the processing overlaps the processing in the first exemplary embodiment, the description will be omitted.

In step S2403, the communication apparatus 101 determines whether multi-AP is selected after wireless setting screen is displayed. In a case where it is determined in step S2403 that multi-AP communication is selected (YES in step S2403), the processing proceeds to step S704. In a case where it is determined in step S2403 that multi-AP communication is not selected (NO in step S2403), the processing proceeds to step S713 of FIG. 7.

In step S705, the communication apparatus 101 determines whether an AP that communicates with an STA or a different AP using 6 GHz when a network is constructed via multi-AP communication is included. In a case where an AP that communicates with an STA or a different AP using 6 GHz is included (YES in step S705), the processing proceeds to step S706. In a case where it is determined in step S705 that an AP that communicates with an STA or a different AP using 6 GHz is not included (NO in step S705), the processing proceeds to step S713. In step S713, methods including WPA2 in addition to WPA3 are displayed in a selected state.

In step S716, the communication apparatus 101 determines whether an STA that has transmitted a request for connection to the constructed network including 6 GHz in multi-AP communication has transmitted the connection request using WPA3. In a case where it is determined in step S716 that the STA has transmitted the connection request using WPA3 (YES in step S716), the processing proceeds to step S718. In step S718, the communication apparatus 101 advances authentication. In a case where it is determined in step S716 that the STA has transmitted the connection request not using WPA3 (NO in step S716), the processing proceeds to step S717. In step S717. the communication apparatus 101 refuses connection. In addition, SAE-PK or SAE hash-to-element may be used in place of WPA3. Alternatively, determination may be made based on a connection request transmitted using a Password ID.

In addition, a communication partner to which a connection request is transmitted in step S712 may be an AP. When a network is constructed via multi-AP communication, display may be controlled in such a manner that WPA3 is selected. Because a UI display method of controlling display to the display only including WPA3 is similar to that in the first exemplary embodiment, the description will be omitted.

In this manner, by performing control in such a manner that WPA3 is selected as a security method when a network supporting 6 GHz is constructed via multi-AP communication, it is possible to avoid executing communication using a method equal to or earlier than the WPA2, and improve security. In addition, a method equal to or earlier than the WPA2 is prevented from being used in communication in the 6-GHz band.

Other Exemplary Embodiments

In each exemplary embodiment, it is determined that there is a possibility that 6 GHz is included, when "automatic" is selected as a set channel, and control is performed in such a manner that only WPA3 and OPEN (AES) are displayed, but the configuration is not limited to this. For example, control may be executed as follows. In a case where WPA3-SAE is selected as an authentication/cipher method, a link of multi-link communication is constructed by including 6 GHz. In a case where WPA2-PSK/WPA3-SAE is selected, a link of multi-link communication is constructed using only 2.4 GHz and 5 GHz. With this configuration, the user can make a network setting without being conscious of a regulation of security strength that is placed based on a band.

In each exemplary embodiment, a GUI including two links has been described, but three or more links may be included. For example, a wireless channel (Link 1), a wireless channel (Link 2), and a wireless channel (Link 3) may be displayed on a GUI screen.

In addition, in each exemplary embodiment, in a case where WPA2 is selected on a setting screen, at a time point at which the execution of communication using 6 GHz is selected, processing of automatically switching the WPA2 to WPA3 may be performed even when 2.4 GHz or 5 GHz is selected. With this configuration, even when an existing network operates using an authentication/cipher method equal to or earlier than the WPA2, control can be performed in such a manner that WPA3 is selected. At the time, a passphrase that has been used in the WPA2 may be used again. In addition, the user may be notified that the WPA2 has been changed to the WPA3. In addition, in a case where an STA not supporting WPA3 is connected when automatic switching is performed, the user may be notified that a setting change cannot be performed.

In each exemplary embodiment, a setting method of a communication method or a security method is a setting method that uses a screen, but the setting method is not limited to this. For example, a communication method or a security method may be set based on voice input. Alternatively, a communication method or a security method may be set based on command input executed using a character string. In the case of command input, for example, when the user tries to set only WPA2 in spite of multi-link communication, an error may be displayed, and it may be indicated that the setting cannot be made.

In each exemplary embodiment, an error is displayed when the user selects an unselectable choice. Beep sound may be output in accordance with the error.

In the present exemplary embodiment, the description has been given using WPA3 as an example, but the present exemplary embodiment is applicable also to a case where WPA4 or the like is formulated in the days ahead as a succeeding standard of the WPA3.

The communication apparatuses 101 and 102 described in the present exemplary embodiment may be printers each including printing means. In a case where the communication apparatuses 101 and 102 operate as printers, the communication apparatuses 101 and 102 can print data acquired by communicating with a partner apparatus, for example.

In addition, the communication apparatuses 101 and 102 described in the present exemplary embodiment may be cameras each including imaging means. In a case where the communication apparatuses 101 and 102 operate as cameras, the communication apparatuses 101 and 102 can transmit data obtained by executing image capturing by communicating with a partner apparatus, for example.

In addition, a recording medium on which a program code of software for implementing the above-described function is recorded may be supplied to a system or an apparatus, and a computer (CPU, MPU) of the system or the apparatus may read out and execute the program code stored in the recording medium. In this case, the program code read out from a storage medium implements the function of the above-described exemplary embodiment, and a storage medium storing the program code forms the above-described apparatus.

As a storage medium for supplying the program code, for example, a flexible disk, a hard disk, an optical disk, a magneto-optical disk, a CD-ROM, a CD-R, a magnetic tape, a nonvolatile memory card, a ROM, a DVD, or the like cam be used.

In addition, not only the above-described function is implemented by a computer executing a read program code, an OS operating on the computer may implement the above-described function by performing a part or all of actual processing based on an instruction of the program code. The OS stands for an Operating System.

Furthermore, a program code read out from a storage medium is written into a function expansion board inserted into a computer, or a memory included in a function expansion unit connected to the computer. Then, based on an instruction of the program code, the function expansion board or a CPU included in the function expansion unit may perform part or all of actual processing and implement the above-described function.

The present invention can also be implemented by processing of supplying a program for implementing one or more functions of the above-described exemplary embodiment, to a system or an apparatus via a network or a storage medium, and one or more processors in a computer of the system or the apparatus reading out and executing the program. In addition, the present invention can also be implemented by a circuit (for example, application specific integrated circuit (ASIC)) that implements one or more functions The disclosure of the present exemplary embodiment includes the following configurations.

(Configuration 1)

A communication apparatus that can execute authentication that uses a Wi-Fi Protected Access (WPA)2 method and authentication that uses a WPA3 method, includes establishment means for establishing a link between the communication apparatus and another communication apparatus via a frequency channel, and control means for controlling authentication of communication with the other communication apparatus, in which, when communication is performed with the other communication apparatus in a state in which a plurality of links is established by the establishment means between the communication apparatus and the other communication apparatus, the control means executes authentication using the WPA3 method based on a frequency channel to be used in at least one of the plurality of links, being a frequency channel included in a specific frequency band.

(Configuration 2)

The communication apparatus according to Configuration 1, further includes reception means for receiving an instruction to perform communication with the other communication apparatus in a state in which a plurality of links is established between the communication apparatus and the other communication apparatus, in which, based on an instruction to perform the communication using a frequency channel included in the specific frequency band, being received by the reception means, a display unit is controlled in such a manner as to execute authentication using the WPA3 method.

(Configuration 3)

The communication apparatus according to Configuration 1 or 2, in which communication to be performed with the other communication apparatus in a state in which the plurality of links is established by the establishment means between the communication apparatus and the other communication apparatus is multi-link communication complying with an Institute of Electrical and Electronics Engineers (IEEE) 802.11 standard series.

(Configuration 4)

A communication apparatus that can execute authentication that uses a Wi-Fi Protected Access (WPA)2 method and authentication that uses a WPA3 method, and operates as an access point of communication, includes communication means for performing communication with another communication apparatus, and control means for controlling authentication of communication with the other communication apparatus, in which the control means performs control in such a manner as to perform authentication using the WPA3 method based on a frequency channel to be used in communication of performing a cooperative operation between the communication apparatus and the other communication apparatus, being a frequency channel included in a specific frequency band.

(Configuration 5)

The communication apparatus according to Configuration 4, further includes reception means for receiving an instruction to execute communication of performing a cooperative operation between the communication apparatus and the other communication apparatus, in which, based on an instruction to perform the communication using a frequency channel included in the specific frequency band, being received by the reception means, a display unit is controlled in such a manner as to execute authentication using the WPA3 method.

(Configuration 6)

The communication apparatus according to any one configuration of Configurations 1 to 5, in which, in a case where a frame storing information indicating that authentication is to be executed using the WPA3 method is not received from the other communication apparatus, the communication apparatus performs control in such a manner as not to establish connection with the other communication apparatus.

(Configuration 7)

A communication apparatus that can execute authentication that uses a first security method and authentication that uses a second security method, includes establishment means for establishing a link between the communication apparatus and another communication apparatus via a frequency channel, and control means for controlling authentication of communication with the other communication apparatus, in which, when communication is performed with the other communication apparatus in a state in which a plurality of links is established by the establishment means between the communication apparatus and the other communication apparatus, control is performed in such a manner as to execute authentication using the first security method based on a frequency channel to be used in at least one of the plurality of links, being a frequency channel included in a specific frequency band, and to execute authentication using the first security method or the second security method based on none of frequency channels to be used in the plurality of links, being a frequency channel included in the specific frequency band.

(Configuration 8)

The communication apparatus according to Configuration 7, further includes reception means for receiving an instruction to perform communication with the other communication apparatus in a state in which a plurality of links is established between the communication apparatus and the other communication apparatus, in which, based on an instruction to perform the communication using a frequency channel included in the specific frequency band, being received by the reception means, a display unit is controlled in such a manner as to execute authentication using the first security method.

(Configuration 9)

The communication apparatus according to Configuration 7 or 8, in which communication to be performed with the other communication apparatus in a state in which the plurality of links is established by the establishment means between the communication apparatus and the other communication apparatus is multi-link communication complying with an Institute of Electrical and Electronics Engineers (IEEE) 802.11 standard series.

(Configuration 10)

A communication apparatus that can execute authentication that uses a first security method and authentication that uses a second security method, and operates as an access point of communication, includes communication means for performing communication with another communication apparatus, and control means for controlling authentication of communication with the other communication apparatus, in which the control means performs control in such a manner as to execute authentication using the first security method based on a frequency channel to be used in communication of performing a cooperative operation between the communication apparatus and the other communication apparatus, being a frequency channel included in a specific frequency band, and to execute authentication using the first security method or the second security method based on a frequency channel to be used in communication of performing the cooperative operation, being not a frequency channel included in the specific frequency band.

(Configuration 11)

The communication apparatus according to Configuration 10, further includes reception means for receiving an instruction to execute communication in which the communication apparatus and the other communication apparatus perform a cooperative operation, in which, based on an instruction to perform the communication using a frequency channel included in the specific frequency band, being received by the reception means, a display unit is controlled in such a manner as to execute authentication using the first security method.

(Configuration 12)

The communication apparatus according to any configuration of Configurations 7 to 11, in which, in a case where a frame storing information indicating that authentication is to be executed using the first security method is not received from the other communication apparatus, the communication apparatus performs control in such a manner as not to establish connection with the other communication apparatus.

(Configuration 13)

The communication apparatus according to any one configuration of Configurations 1 to 12, in which the specific frequency band is a 6-gigahertz (GHz) band.

(Configuration 14)

The communication apparatus according to any one configuration of Configurations 7 to 13, in which the first security method is Wi-Fi Protected Access (WPA3).

(Configuration 15)

The communication apparatus according to any one configuration of Configurations 7 to 14, in which the second security method is WPA or WPA2.

(Configuration 16)

A program for causing a computer to function as each means of the communication apparatus according to any one configuration of Configurations 1 to 15.

The present invention is not limited to the above-described exemplary embodiments, and various changes and modifications can be made without departing from the spirit and the scope of the present invention. Accordingly, the following claims are appended to publicize the scope of the present invention.

This application claims the benefit of Japanese Patent Application No. 2021-096515, filed Jun. 9, 2021, and Japanese Patent Application No. 2022-073892, filed Apr. 27, 2022, which are hereby incorporated by reference herein in their entirety.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, when a communication apparatus performs communication with another communication apparatus via a plurality of frequency channels, in the case of operating in a specific frequency channel, it is possible to perform authentication and cipher using a specific authentication method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus configured to support at least a security method that uses Wi-Fi Protected Access (WPA) 2 and a security method that uses WPA3, the communication apparatus comprising:

at least one memory that stores a set of instructions; and at least one processor that executes the instructions, the instructions, when executed, causing the communication apparatus to perform operations comprising:

providing, to a display unit, a display item for accepting a selection of a security method for a network constructed by the communication apparatus;

wherein, in the display item, a first display item for accepting a selection of a security method for a first network capable of setting up a plurality of links allows selection of only a security method that uses WPA3 or a security method that uses Opportunistic Wireless Encryption (OWE).

2. The communication apparatus according to claim 1, wherein, in the display item, a second display item for accepting a selection of a security method for a second network capable of setting up a single link using a frequency channel included in a 6-gigahertz (GHz) band allows selection of only a security method that uses WPA3 or a security method that uses OWE.

3. The communication apparatus according to claim 1, wherein, the communication performed in the state where the plurality of links is established is a multi-link complying with Institute of Electrical and Electronics Engineers (IEEE) 802.11 standard series.

4. The communication apparatus according to claim 1, wherein the plurality of links includes a link established via a frequency channel included in a 6-gigahertz (GHz) band.

5. The communication apparatus according to claim 1, wherein the first display item allows selection of only a security method that uses WPA3.

6. The communication apparatus according to claim 1, wherein, in the display item, a third display item for accepting a selection of a security method for a third network capable of setting up a single link using a frequency channel included in a 2.4 GHz band allows selection of any one of a plurality of security methods including at least a security method that uses WPA2.

7. The communication apparatus according to claim 1, wherein, in the display item, a fourth display item for accepting a selection of a security method for a fourth network capable of setting up a single link using a frequency channel included in a 5 GHz band allows selection of any one of a plurality of security methods including at least a security method that uses WPA2.

8. The communication apparatus according to claim 1, wherein the first display item displays a security method other than the security method that uses WPA3 or the security method that uses OWE in a grayed-out state to indicate that said security method is unselectable.

9. The communication apparatus according to claim 1, wherein the display unit is included in an external apparatus capable of communicating with the communication apparatus, and wherein the providing the display item includes transmitting information for displaying the display item to the external apparatus.

10. A control method for a communication apparatus that can execute at least a security method that uses Wi-Fi Protected Access (WPA) 2 and a security method that uses WPA3, the method comprising:

providing, to a display unit, a display item for accepting a selection of a security method for a network constructed by the communication apparatus;

wherein, in the display item, a first display item for accepting a selection of a security method for a first network capable of setting up a plurality of links allows selection of only a security method that uses WPA3 or a security method that uses Opportunistic Wireless Encryption (OWE).

11. A non-transitory computer-readable storage medium storing a program for causing a computer to function as a method for a communication apparatus according to claim 10.

* * * * *